(12) United States Patent
Lundberg et al.

(10) Patent No.: US 12,489,624 B2
(45) Date of Patent: Dec. 2, 2025

(54) AUTHENTICATING AN ELECTRONIC DEVICE BASED ON THRESHOLD CRYPTOGRAPHY USING PARTIAL SECRET KEYS

(71) Applicant: ASSA ABLOY AB, Stockholm (SE)

(72) Inventors: Frans Lundberg, Saltsjöbaden (SE); Martin Kaufmann, Graz (AT); Adam Augustyn, Krzeszowice (PL)

(73) Assignee: ASSA ABLOY AB, Stockholm (SE)

( * ) Notice: Subject to any disclaimer, the term of this patent is extended or adjusted under 35 U.S.C. 154(b) by 62 days.

(21) Appl. No.: 18/704,524

(22) PCT Filed: Oct. 26, 2022

(86) PCT No.: PCT/EP2022/079976
§ 371 (c)(1),
(2) Date: Apr. 25, 2024

(87) PCT Pub. No.: WO2023/073040
PCT Pub. Date: May 4, 2023

(65) Prior Publication Data
US 2025/0023726 A1 Jan. 16, 2025

(30) Foreign Application Priority Data

Oct. 26, 2021 (SE) .................................. 2151304-9
Oct. 26, 2021 (SE) .................................. 2151305-6
(Continued)

(51) Int. Cl.
*H04L 9/08* (2006.01)
*H04L 9/32* (2006.01)

(52) U.S. Cl.
CPC .......... *H04L 9/0894* (2013.01); *H04L 9/3252* (2013.01)

(58) Field of Classification Search
CPC ...... H04L 9/085; H04L 9/0894; H04L 9/3252
See application file for complete search history.

(56) References Cited

U.S. PATENT DOCUMENTS 9,032,212 B1    5/2015  Juels
9,397,827 B2 *  7/2016  O'Hare ................. G06F 21/606
(Continued)

FOREIGN PATENT DOCUMENTS

CN    110289968    9/2019
CN    112054898    12/2020
(Continued)

OTHER PUBLICATIONS

"SE application 2151304-9 Office Actin mailed Jun. 9, 2022", 9 pages.
(Continued)

*Primary Examiner* — Hee Soo Kim
(74) *Attorney, Agent, or Firm* — Schwegman Lundberg & Woessner, P.A.

(57) ABSTRACT

It is provided a method for performing an action by an electronic device (2), based on a first partial secret key (10a) and a corresponding second partial secret key (10b), wherein the first partial secret key (10a) and the second partial secret key (10b) form part of a threshold cryptography scheme (11) associated with a public key (12). The method comprises: transmitting (40), upon the device initialising, a request for a first partial secret key (10a) to a key server (3); receiving (42) the first partial secret key (10a) from the key server (3); storing (44) the first partial secret key (10a) only in volatile memory (70); retrieving (46) a second partial secret key (10b) from non-volatile memory (71); and performing (48) an action based on applying both the first partial secret key (10a) and the second partial secret key (10b).

13 Claims, 7 Drawing Sheets

(30) Foreign Application Priority Data

| Oct. 26, 2021 | (SE) | 2151306-4 |
|---|---|---|
| Oct. 26, 2021 | (SE) | 2151307-2 |
| Oct. 26, 2021 | (SE) | 2151308-0 |
| Oct. 26, 2021 | (SE) | 2151309-8 |

(56) References Cited

U.S. PATENT DOCUMENTS

| | | |
|---|---|---|
| 9,455,968 B1 | 9/2016 | Machani et al. |
| 9,813,244 B1 | 11/2017 | Triandopoulos et al. |
| 11,025,598 B1 | 6/2021 | Laghaeian et al. |
| 11,057,210 B1 | 7/2021 | Sierra et al. |
| 2001/0055388 A1 | 12/2001 | Kaliski |
| 2015/0317480 A1 | 11/2015 | Gardner et al. |
| 2016/0162671 A1 | 6/2016 | Baca et al. |
| 2016/0269186 A1 | 9/2016 | Wallrabenstein |
| 2016/0294562 A1* | 10/2016 | Oberheide ............ H04L 9/0863 |
| 2017/0063559 A1 | 3/2017 | Wallrabenstein |
| 2017/0103228 A1 | 4/2017 | Yavuz |
| 2017/0142579 A1 | 5/2017 | Gaudet et al. |
| 2017/0187523 A1* | 6/2017 | Andrews ................. H04L 9/085 |
| 2018/0323969 A1 | 11/2018 | Pahl et al. |
| 2019/0034936 A1 | 1/2019 | Nolan et al. |
| 2019/0229929 A1 | 7/2019 | Camenisch et al. |
| 2020/0127835 A1 | 4/2020 | Fletcher et al. |
| 2020/0134212 A1 | 4/2020 | Hutchison et al. |
| 2020/0162246 A1 | 5/2020 | Schouppe |
| 2020/0213113 A1 | 7/2020 | Savanah et al. |
| 2020/0353167 A1* | 11/2020 | Vivek ..................... H04L 9/085 |
| 2020/0396212 A1 | 12/2020 | Schiffman et al. |
| 2021/0081547 A1 | 3/2021 | Marson et al. |
| 2021/0167969 A1 | 6/2021 | Cheon et al. |
| 2021/0306139 A1 | 9/2021 | Wright et al. |
| 2021/0314142 A1 | 10/2021 | Lai et al. |

FOREIGN PATENT DOCUMENTS

| | | |
|---|---|---|
| EP | 1197032 | 8/2007 |
| EP | 3265943 | 1/2018 |
| EP | 3496331 | 6/2019 |
| WO | 2006078557 | 7/2006 |
| WO | 2017172314 | 10/2017 |
| WO | 2021035295 | 3/2021 |
| WO | 2021130748 | 7/2021 |
| WO | 2023073040 | 5/2023 |

OTHER PUBLICATIONS

"SE application 2151304-9 Office Actin mailed Sep. 22, 2023", 6 pages.

"SE application 2151305-6 Office Actin mailed May 20, 2022", 9 pages.

"SE application 2151305-6 Office Actin mailed Aug. 29, 2023", 6 pages.

"SE application 2151306-4 Office Actin mailed Jun. 13, 2022", 8 pages.

"SE application 2151307-2 Office Actin mailed Jul. 1, 2022", 11 pages.

"SE application 2151308-0 Office Actin mailed Jun. 22, 2022", 12 pages.

"SE application 2151309-8 Office Actin mailed Jun. 23, 2022", 9 pages.

"PCT EP 2022079976 ISR mailed Feb. 17, 2023", 6 pages.

"PCT EP 2022079976 Written Opinion mailed Feb. 17, 2023", 8 pages.

Arthur, Marcella P., "Unbound Tech Raises $20M In Series B Funding to Support Global Growth", [Online]. Retrieved from the Internet: https: www.prnewswire.com news-releases unbound-tech-raises-20m-in-series-b-funding-to-support-global-growth-301174564.html, (Nov. 17, 2020), 4 pages.

Assa Abloy, "Java library for dual signing two part singning and dual decryption two part decryption based on the NaCl library primitives", [Online]. Retrieved from the Internet: https: github.com assaabloy-ppi dualsalt, (Accessed online Feb. 26, 2024), 4 pages.

Aumasson, Jean Philippe, "A Survey of ECDSA Threshold Signing", Cryptology ePrint Archive, (Nov. 2020), 14 pages.

Bernstein, Daniel J., "High-speed high-security signatures", Journal of Cryptographic Engineering vol. 2, (Aug. 14, 2012), 23 pages.

Bernstein, Daniel J., "Ed25519 high speed high security signatures", [Online]. Retrieved from the Internet: https: ed25519.cr.yp.to papers.html, (Accessed online Apr. 22, 2024), 1 pages.

BNB Chain TSS LIB, "Threshold Signature Scheme, for ECDSA and EDDSA", [Online]. Retrieved from the Internet: https: github.com bnb-chain tss-lib, (Accessed online Feb. 26, 2024), 4 pages.

Brandao, Luis T. A. N., "NIST Roadmap Toward Criteria for Threshold Schemes for Cryptographic Primitives", NIST Interagency Internal Report NISTIR 8214A, (Jul. 2020), 39 pages.

Certicom Research, "Sec 2: Recommended Elliptic Curve Domain Parameters", Certicom Research Version 1.0, (Sep. 20, 2000), 51 pages.

Dikshit, Pratyush, "Efficient weighted threshold ECDSA for securing bitcoin wallet", 2017 ISEA Asia Security and Privacy, (Jan. 2017), 9 pages.

Gennaro, Rosario, "Fast Multiparty Threshold ECDSA with Fast Trustless Setup", Session 6C Crypto 3 CCS 2018 Toronto ON Canada, (Oct. 15-19, 2018), 16 pages.

Gillmor, D., "Negotiated Finite Field Diffie-Hellman Ephemeral Parameters for Transport Layer Security (TLS)", ISSN: 2070-1721, (Aug. 2016), 29 pages.

Hakanols, "Threshold signing and decryption inspired by TweetNaCl", [Online]. Retrieved from the Internet: https: github.com hakanols ThresholdSalt, (Accessed online Feb. 26, 2024), 2 pages.

Hallam Baker, Phillip, "Threshold Signatures in Elliptic Curves", [Online]. Retrieved from the Internet: https: datatracker.ietf.org doc draft-hallambaker-threshold-sigs , (Accessed online Feb. 26, 2024), 2 pages.

Hallam-Baker, P. M., "Threshold Signatures in Elliptic Curves", [Online]. Retrieved from the Internet: https: www.ietf.org archive id draft-hallambaker-threshold-sigs-06.html, (Accessed online Apr. 22, 2024), 24 pages.

Kel BZ, "P-256 in Sage", [Online]. Retrieved from the Internet: https: kel.bz post sage-p256 , (Jan. 10, 2020), 3 pages.

Mohaisen, Abedelaziz, "Protection Techniques of Secret Information in Non tamper Proof Devices of Smart Home Network", UIC 2008 Lecture Notes in Computer Science vol. 5061, (Jun. 2008), 15 pages.

Parakh, Abhishek, "A Tree Based Recursive Information Hiding Scheme", IEEE ICC 2010 proceedings, (May 2010), 5 pages.

Wikipedia, "Edwards curve", [Online]. Retrieved from the Internet: https: en.wikipedia.org wiki Edwards_curve, (Accessed online Apr. 22, 2024), 8 pages.

Zhang, Chenchen, "A new construction of threshold cryptosystems based on RSA", Information Sciences 363, (Oct. 2016), 14 pages.

Zhao, Shushan, "A Survey of Applications of Identity-Based Cryptography in Mobile Ad-Hoc Networks", IEEE Communications Surveys and Tutorials vol. 14 Issue 2, (Q2 2012), 21 pages.

* cited by examiner

AUTHENTICATING AN ELECTRONIC DEVICE BASED ON THRESHOLD CRYPTOGRAPHY USING PARTIAL SECRET KEYS

CROSS-REFERENCE TO RELATED APPLICATION(S)

This application is a national stage application under 35 U.S.C. § 371 of PCT Appl. No. PCT/EP2022/079976, titled "Authenticating an Electronic Device," filed Oct. 26, 2022, which claims priority to Swedish Patent Appl. No. 2151304-9, filed Oct. 26, 2021, Swedish Patent Appl. No. 2151305-6, filed Oct. 26, 2021, Swedish Patent Appl. No. 2151306-4, filed Oct. 26, 2021, Swedish Patent Appl. No. 2151307-2, filed Oct. 26, 2021, Swedish Patent Appl. No. 2151308-0, filed Oct. 26, 2021, and Swedish Patent Appl. No. 2151309-8, filed Oct. 26, 2021, each of which is incorporated herein by reference in its entirety.

TECHNICAL FIELD

The present disclosure relates to the field of authenticating an electronic device and in particular to authenticating an electronic device based on interaction with an authentication server.

BACKGROUND

Electronic devices are becoming abundant in modern life. Electronic devices are provided as personal user device, e.g. computers, smartphones, wearable devices. Also, electronic devices are provided in the field, e.g. as ATM (Automatic Teller Machines), vending machines, information kiosks, etc.

However, there is a risk of theft for any equipment with value. This is a particular problem for electronic devices that are in the field. Any improvement in preventing stolen equipment from being used would be of great benefit, since that can deter thefts from occurring in the first place.

SUMMARY

One object is to reduce the risk of electronic machines in the field being stolen.

According to a first aspect, it is provided a method for performing an action by an electronic device, based on a first partial secret key and a corresponding second partial secret key, wherein the first partial secret key and the second partial secret key form part of a threshold cryptography scheme associated with a public key. The method is performed by the electronic device. The method comprises: transmitting, upon the device initialising, a request for a first partial secret key to a key server; receiving the first partial secret key from the key server; storing the first partial secret key only in volatile memory; retrieving a second partial secret key from non-volatile memory; and performing an action based on applying both the first partial secret key and the second partial secret key.

The performing an action may comprise: interacting with an authentication server to authenticate the electronic device based on performing a cryptographic operation, such that the electronic device applies both the first partial secret key and the second partial secret key, wherein a threshold of at least two out of the partial secret keys of the threshold cryptography scheme are required for applying the threshold cryptography scheme for performing the cryptographic operation, wherein a positive authentication is necessary for normal operation of the electronic device.

The performing an action may comprise at least one of the following: decrypting data stored in the non-volatile memory, communicating with an external entity, communicating with an internal entity in which the electronic device is provided.

The method may further comprise: receiving an updated second partial secret key, corresponding to an updated first partial secret key that collectively form part of the threshold cryptography scheme that still corresponds to the public key; and replacing the previously stored second partial secret key in non-volatile memory with the updated second partial secret key.

The interacting may comprise applying a cryptographic signature to a data item provided by the authentication server.

The threshold number may be two and the threshold cryptography scheme contains only two partial secret keys.

The threshold cryptography scheme may be based on an Elliptic Curve Digital Signature Algorithm, ECDSA.

According to a second aspect, it is provided an electronic device for performing an action based on a first partial secret key and a corresponding second partial secret key, wherein the first partial secret key and the second partial secret key form part of a threshold cryptography scheme associated with a public key. The electronic device comprises: a processor; and a memory storing instructions that, when executed by the processor, cause the electronic device to: transmit, upon the device initialising, a request for a first partial secret key to a key server; receive the first partial secret key from the key server; store the first partial secret key only in volatile memory; retrieve a second partial secret key from non-volatile memory; and perform an action based on applying both the first partial secret key and the second partial secret key.

The instructions to perform an action may comprise instructions that, when executed by the processor, cause the electronic device to: interact with an authentication server to authenticate the electronic device based on performing a cryptographic operation, such that the electronic device applies both the first partial secret key and the second partial secret key, wherein a threshold of at least two out of the partial secret keys of the threshold cryptography scheme are required for applying the threshold cryptography scheme for performing the cryptographic operation, wherein a positive authentication is necessary for normal operation of the electronic device.

The instructions to perform an action may comprise instructions that, when executed by the processor, cause the electronic device to perform at least one of the following: decrypting data stored in the non-volatile memory, communicating with an external entity, communicating with an internal entity in which the electronic device is provided.

The electronic device may further comprise instructions that, when executed by the processor, cause the electronic device to: receive an updated second partial secret key, corresponding to an updated first partial secret key that collectively form part of the threshold cryptography scheme that still corresponds to the public key; and replace the previously stored second partial secret key in non-volatile memory with the updated second partial secret key.

The instructions to interact may comprise instructions that, when executed by the processor, cause the electronic device to apply a cryptographic signature to a data item provided by the authentication server.

The threshold number may be two and the threshold cryptography scheme contains only two partial secret keys.

The threshold cryptography scheme may be based on an Elliptic Curve Digital Signature Algorithm, ECDSA.

According to a third aspect, it is provided a computer program for performing an action by an electronic device based on a first partial secret key and a corresponding second partial secret key, wherein the first partial secret key and the second partial secret key form part of a threshold cryptography scheme associated with a public key. The computer program comprises computer program code which, when executed on an electronic device causes the electronic device to: transmit, upon the device initialising, a request for a first partial secret key to a key server; receive the first partial secret key from the key server; store the first partial secret key only in volatile memory; retrieve a second partial secret key from non-volatile memory; and perform an action based on applying both the first partial secret key and the second partial secret key.

According to a fourth aspect, it is provided a computer program product comprising a computer program according to the third aspect and a computer readable means comprising non-volatile memory in which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

According to embodiments presented herein, it is provided a way to authenticate an electronic device. This is based on threshold cryptography where, upon the electronic device initialising the electronic device obtains at least a first partial secret key from a key server. A second partial secret key is retrieved from non-volatile memory in the electronic device. Both partial secret keys are then used for performing an action in the electronic device (that cannot be performed without having access to both partial secret keys. For instance, the action can be authenticating with an authentication server, in which case a positive authentication is necessary for normal operation of the electronic device. Other examples of actions are decrypting data stored in the non-volatile memory, communicating with an external entity, communicating with an internal entity in which the electronic device (2). If the electronic device is stolen, the owner/operator of the electronic device reports the theft, and the key server is prevented from supplying the first partial secret key when requested. In this way, when the stolen electronic device is initialised, it will be unable to perform the action and normal operation is prevented. This makes the electronic device inoperable and thus reduces any gain from stealing the electronic device in the first place.

Figure 1:
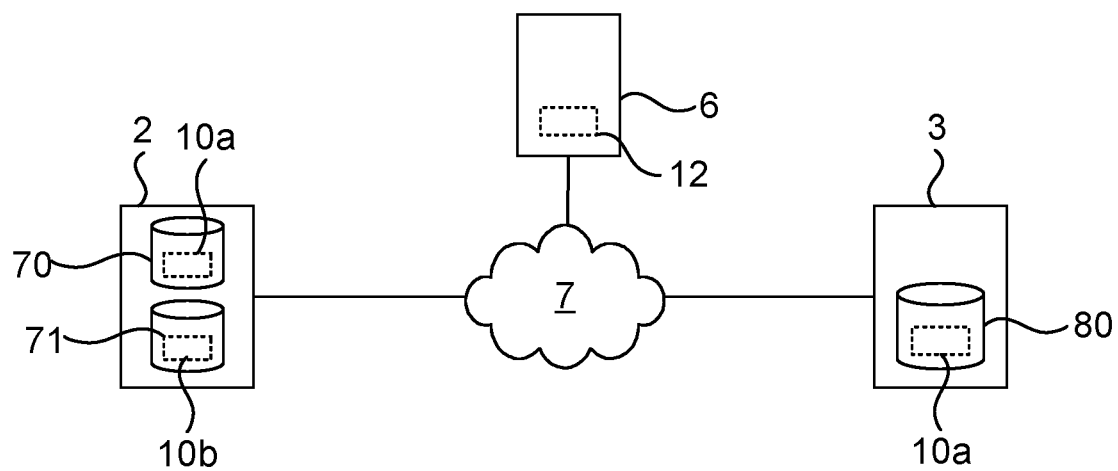
FIG. 1 is a schematic diagram illustrating an environment in which embodiments presented herein can be applied.

FIG. 1 is a schematic diagram illustrating an environment in which embodiments presented herein can be applied. An electronic device 2 can be any suitable electronic device. For instance, the electronic device 2 can be a mains-powered device such as a vending machine, ATM, information kiosk, etc. When the electronic device 2 is mains powered, if the electronic device is stolen, any data in the volatile memory is lost when the electronic device is disconnected from power. Alternatively, the electronic device can form part of a vehicle. Alternatively, the electronic device can be a user device, such as a smartphone, mobile phone, wearable device, tablet computer, laptop computer, desktop computer, digital physical key (e.g. key fob, key card), etc. It is to be noted that the embodiments presented herein can be applied for multiple electronic devices even though only one is shown in FIG. 1. The electronic device 2 is, at least occasionally, connected to a communication network 7, such as the Internet.

A key server 3 is used to supply a key to the electronic device 2 to enable authentication of the electronic device 2. It is to be noted that the key server 3 can be used in parallel for multiple electronic devices even if its operation in relation to a single electronic device is described herein. The key server 3 comprises non-volatile memory 80 e.g. in the form of magnetic memory, optical memory and/or non-volatile solid-state memory. The non-volatile memory 80 stores a first partial secret key 10a, associated with the electronic device 2.

The electronic device 2 comprises a volatile memory 70 and a non-volatile memory 71. The volatile memory 70 can be in the form of RAM (Random Access Memory) or other type of memory for which any stored data is lost or cleared when the electronic device 2 is powered off or when initialised or reinitialised. The reinitialization can be performed based on a schedule, e.g. every hour, every day, every week, etc. Optionally, the electronic device 2 comprises one or more tampering detection devices. If tampering or any type of theft detection is detected, this can trigger the volatile memory 70 to be reinitialised, which includes clearing the non-volatile memory, or at least the first partial secret key is cleared from the volatile memory. One example of theft detection is to detect an uncharacteristic vibration, e.g. indicating that an electronic device 2 that is normally stationary is moving. Another example of theft detection is a GPS (Global Positioning System) receiver in the electronic device 2 that detects that the device is in an unexpected location.

The non-volatile memory 71 can be in the form of magnetic memory, optical memory or non-volatile solid-state memory. Data stored in the non-volatile memory 71 is retained even when the electronic device 2 is powered off. Upon initialisation, the volatile memory 70 does not contain any partial secret keys. The electronic device 2 communicates with the key server 3 to request the first partial secret key 10a and, when received, stores the first partial secret key 10a in the volatile memory 70. The non-volatile memory 71 stores a second partial secret key 10b.

Optionally, an authentication server 6 is provided to authenticate the electronic device 2 when the electronic device 2 initialises. As described in more detail below, the authentication server 6 performs the authentication based on a public key 12 associated with a threshold cryptography scheme containing the first partial secret key 10a and the second partial secret key 10b. The public key 12 is available to the authentication device 6 prior to or as part of the authentication process. The authentication is thus performed in communication with the electronic device 2, against the public key 12. The electronic device 2 needs to be in possession of both the first partial secret key 10a and the second partial secret key 10b for the authentication to be positive. Only after positive authentication is possible for the electronic device 2 to enter a normal operational mode to perform the functions of the electronic device 2.

Each one of the authentication server 6 and the key server 3 can be implemented using any suitable server hardware and software. In one embodiment, the authentication server 6 and the key server 3 are combined in a single physical device. It is to be noted, however, that during the authentication by the authentication server 6, the first partial secret key 10a must be supplied by the electronic device 2, and not from the memory 80 of the key server 3.

Figure 2:
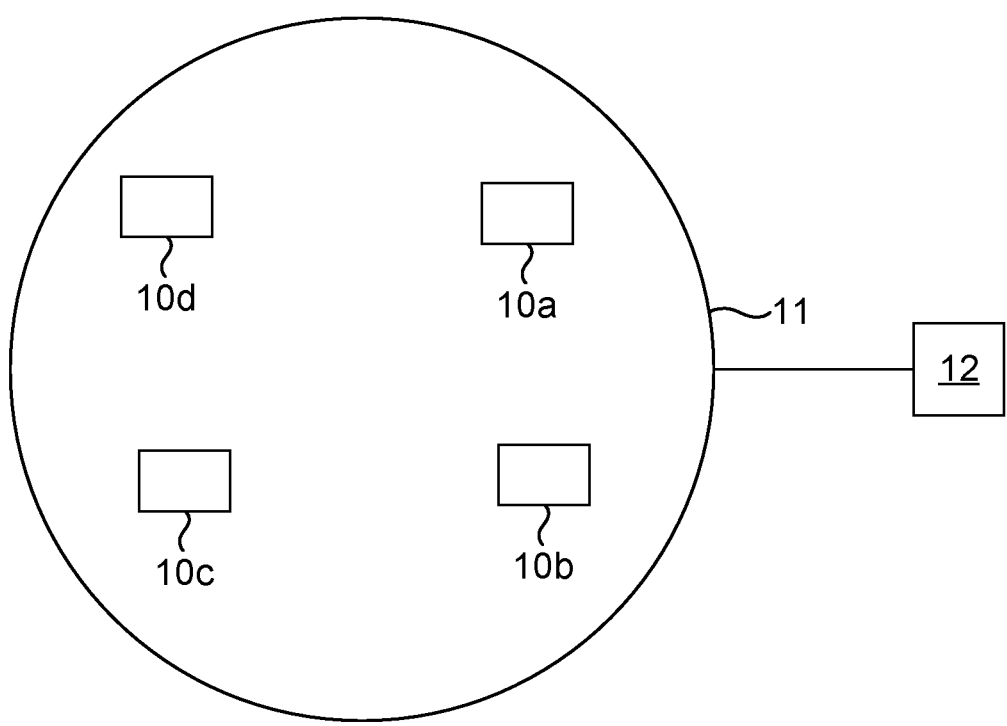
FIG. 2 is a schematic diagram illustrating the concept of threshold cryptography.

FIG. 2 is a schematic diagram illustrating the concept of threshold cryptography, which is employed by embodiments presented herein.

Starting with a summary of traditional asymmetric cryptography, there is a key pair consisting of a public key and a secret key. The public key is associated with an entity or user and is shared publicly. The secret key is coupled to the public key, but the secret key is kept secret. Using the secret key, a user device can perform a cryptographic operation, e.g. cryptographic signing or decryption, which can be used to authenticate an electronic device upon it initialising.

A development in asymmetric cryptography, from its original key pair of a secret key and a public key, is threshold cryptography. In threshold cryptography, there is still a single public key 12, but cryptographic operations are achieved by a threshold number of associated partial secret keys 10a-d for respective entities. Jointly, the group of entities computes and communicates to generate the set of partial secret keys and the associated public key. Each entity its partial secret key. It is to be noted that each partial secret key is secret and is only known to the entity itself. There is no need for this partial secret key to be exposed to any other entity, not even in the key creation phase. Hence, there is no need for a central authority that distributes these partial secret keys.

The threshold condition can be expressed as (t, n), where n denotes the number of available partial secret keys and t denotes the number of partial secret keys that are needed to perform a cryptographic operation (e.g. signing or decryption) corresponding to the (single) public key. For instance, in correspondence with the example of FIG. 2, a (2, 4) threshold cryptography scheme requires that at least 2 out of 4 associated partial secret keys 10a-d are applied to perform the cryptographic operation. When at least the threshold number of partial secret keys are applied, this cryptographic operation, that is secured by the threshold cryptography scheme 11, is performed. It does not matter which ones of the partial secret keys that are applied, as long as at least the threshold number of partial secret keys are applied. The threshold cryptography scheme is defined when the partial secret keys are generated.

Optionally, the partial secret keys can be refreshed. This can be done to limit the life-time of the partial secret keys, (which makes it even harder for an attacker who needs to compromise at least t parties within a time window defined by the life-time). The refresh can also be performed done to consolidate the partial secret keys. For instance, if an entity holding a partial secret key is lost, it makes sense to regenerate the partial secret keys, now for the remaining entities of the group. It is to be noted that the refresh does not affect the public key—the same public key that was used prior to the refresh can be used after the refresh. Again, the refresh is performed without sharing any of the partial secret keys while doing the collaborative refresh computation, e.g. based on multi-party computation, known in the art per se, see the Wikipedia article https://en.wikipedia.org/wiki/Secure_multi-party_computation available at the time that this patent application is filed.

Using threshold cryptography, a compromise of a single device never least to a compromise of the whole threshold cryptography scheme, significantly increasing security.

Threshold cryptography can e.g. be implemented using an Elliptic Curve Digital Signature Algorithm (ECDSA). An example implementation is the Binance implementation, available at https://github.com/binance-chain/tss-lib at the time of filing of this patent application.

Figure 3:
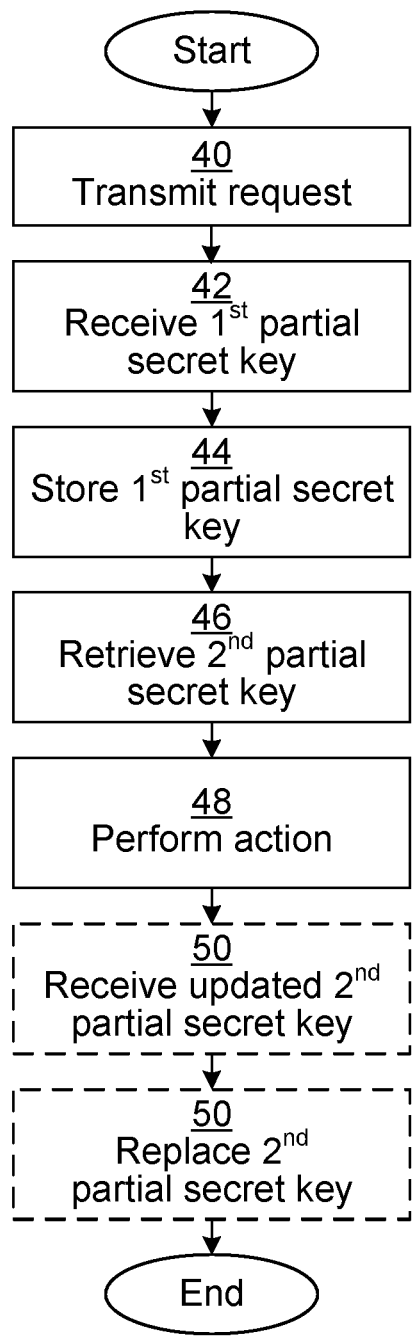
FIG. 3 is a flow chart illustrating embodiments of methods for performing an action by an electronic device.

FIG. 3 is a flow chart illustrating embodiments of methods for performing an action by an electronic device 2, based on a first partial secret key 10a and a corresponding second partial secret key 10b. The first partial secret key 10a and the second partial secret key 10b form part of a threshold cryptography scheme 11 associated with a public key 12. The method is performed by the electronic device 2.

In a transmit request step 40, the electronic device 2 transmits, upon the device initialising, a request for a first partial secret key 10a to a key server 3. The request contains some type of identifier of the electronic device 2, to allow the key server 3 to find the first partial secret key 10a that corresponds to the particular electronic device. The initialising can e.g. be the electronic device booting up or transitioning from a standby state to an operational state. Alternatively, the initialising can be a regularly-triggered initialising. After the initialising is performed, the first partial secret key 10a is not stored in the electronic device (and, in particular, the first partial secret key 10a is not stored in the volatile memory 70 of the electronic device 2). The removal of any partial secret key 10a from the volatile memory can be an effect of entering the standby state (e.g. powering off will automatically clear the RAM memory) or the removal can be part of the initialisation.

The key server 3 checks if there are anything blocking the provision of the first partial key server 10a to the electronic device 2. For instance, if the electronic device 2 has been reported stolen, there is an indication (e.g. in a list or in a database) available to the key server 3 that the key server 3 is blocked from supplying the first partial secret key 10a corresponding to the particular electronic device 2. Hence, if the key server 3 is blocked from providing the first partial secret key 10a for this electronic device 2, the method ends. Otherwise, the key server 3 proceeds and transmits the first partial secret key 10a to the electronic device 2 over the communication network 7.

In a receive $1^{st}$ partial secret key step 42, the electronic device 2 receives the first partial secret key 10a from the key server 3.

In a store $1^{st}$ partial secret key 44, the electronic device 2 stores the first partial secret key 10a only in volatile memory 70. Hence, the first partial secret key 10a is now available in the electronic device 2. However, since the first partial secret key 10a is only stored in the volatile memory 70, the first partial secret key 10a is lost if the electronic device powers off, after which this method needs to be repeated, allowing the key server 3 to act as a check point, checking for any blocked (e.g. stolen) electronic keys 2.

In a retrieve $2^{nd}$ partial secret key 46, the electronic device 2 retrieves a second partial secret 10b from non-volatile memory 71. The second partial secret key 10b can be securely stored in non-volatile memory 71 since it is only usable in collaboration with the first partial secret key 10a that is stored in the volatile memory 70.

In an perform action step 48, the electronic device performs an action based on applying both the first partial secret key 10a and the second partial secret key 10b. For instance, this can comprise interacting with an authentication server 6 to authenticate the electronic device 2 based on performing a cryptographic operation. This interaction comprises that the electronic device 2 applies both the first partial secret key 10a and the second partial secret key 10b. In the threshold cryptography scheme, a threshold of at least two out of the partial secret keys of the threshold cryptography scheme 11 are required for applying the threshold cryptography scheme 11 (for performing the cryptographic operation). When this authentication is performed, a positive authentication is necessary for normal operation of the electronic device 2. In other words, if the authentication with the authentication server 6 fails, the electronic device 2 sets itself in a non-operational state, such as a standby state.

Another action can be decrypting data stored in the non-volatile memory 71, where the data is encrypted with the public key.

Another action can be communicating with an external entity, such as a server, etc, where the external entity can verify the identity of the electronic device 2 using the public key.

Another action can be communicating with an internal entity in which the electronic device 2 is provided. For example, the main control computer of a vehicle may need to authenticate itself to the engine to be allowed to start the engine, where the authentication is based on applying both partial secret keys, which is verified using the public key.

The interacting with the authentication server 6 can comprise applying a cryptographic signature to a data item provided by the authentication server 6.

In an optional receive updated $2^{nd}$ partial secret key step 50, the electronic device 2 receives an updated second partial secret key. The updated second partial secret key corresponds to an updated first partial secret key that collectively form part of the same (pre-update) threshold cryptography scheme 11. Hence, the updated first partial secret key and the updated second partial secret key collectively still correspond to the public key 12. This can be useful if the electronic device 2 has been stolen and is subsequently returned. By updating the partial secret keys 10a, 10b, there is no use of the second partial secret key 10b that may have been compromised during the time that the electronic device 2 was stolen.

In an optional replace $2^{nd}$ partial secret key step 52, the electronic device 2 replaces the previously stored second partial secret key in non-volatile memory with the updated second partial secret key. In this way, only the updated partial secret keys 10a, 10b for the electronic device 2 are used, but these still correspond to the original public key 12.

In one embodiment, the threshold number is two and the threshold cryptography scheme contains only two partial secret keys 10a-b. In other words, both (and the only available) partial secret keys 10a-b need to be applied in the authentication to yield a positive result. As explained above, the threshold cryptography scheme 11 can e.g. be based on an Elliptic Curve Digital Signature Algorithm.

This solution can be of great value for computers in the field, e.g. vending machines, ATMs, information kiosks, etc. If someone steals such a device, when it is initialised again, it will need to communicate with the remote service for authentication. Additionally, embodiments presented herein can be applied for any high value device, e.g. vehicle, that can be made unoperational using the presented solution. When the theft is detected, the owner of the device can inactivate the remote service part of the authentication for the machine, whereby authentication will fail on powering up the machine.

Figure 4:
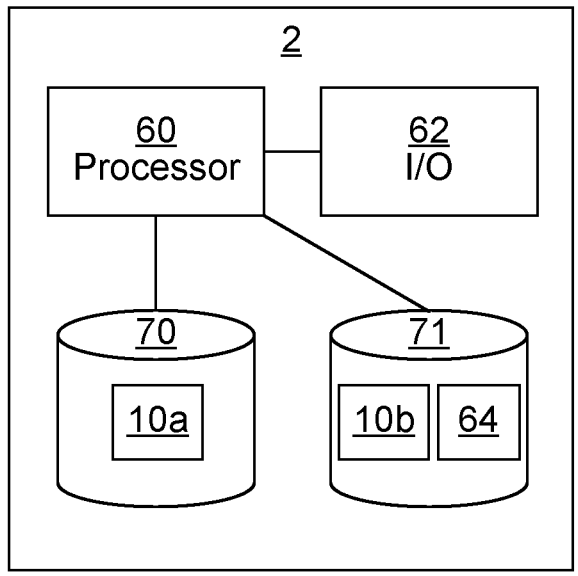
FIG. 4 is a schematic diagram illustrating components of the electronic device of FIG. 1, the validation server of FIG. 7, the recovery control device of FIG. 9, the biometric control device of FIG. 12, the coordinating user device of FIG. 14, and/or the hardware integrity device of FIG. 16.
Figure 7:
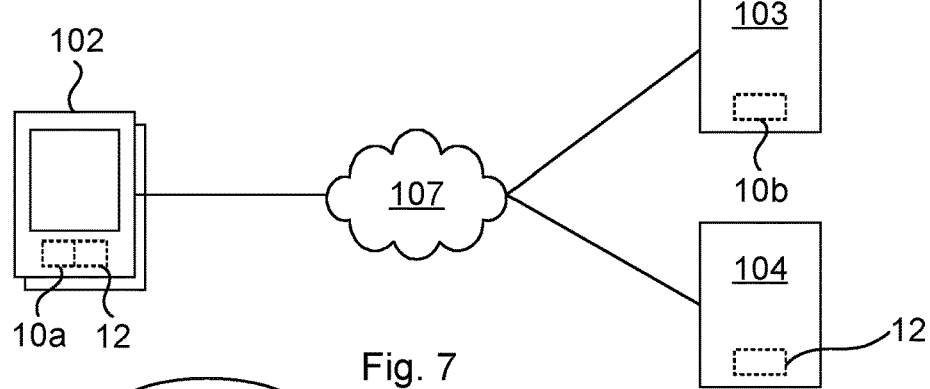
FIG. 7 is a schematic diagram illustrating an environment in which embodiments presented herein can be applied.
Figure 8:
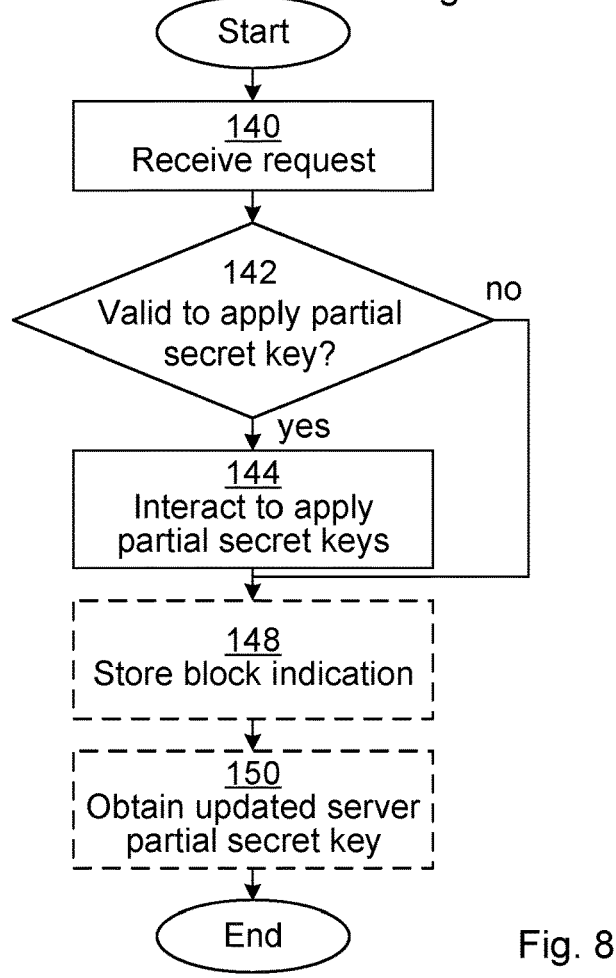
FIG. 8 is a flow chart illustrating embodiments of methods for applying a server partial secret key conditional on blocked status.
Figure 9:
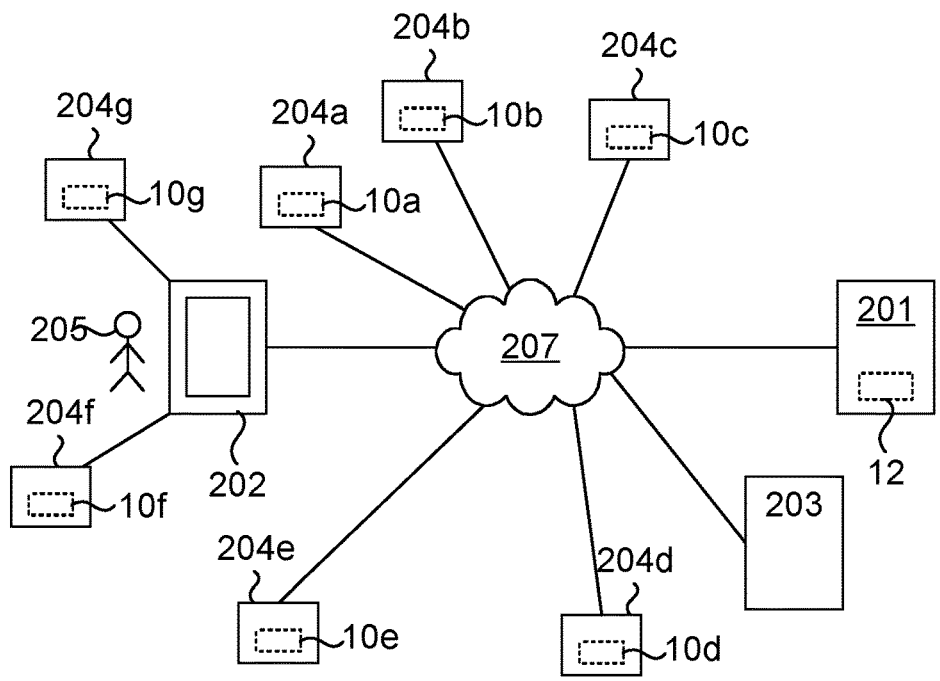
FIG. 9 is a schematic diagram illustrating an environment in which embodiments presented herein can be applied.
Figure 12:
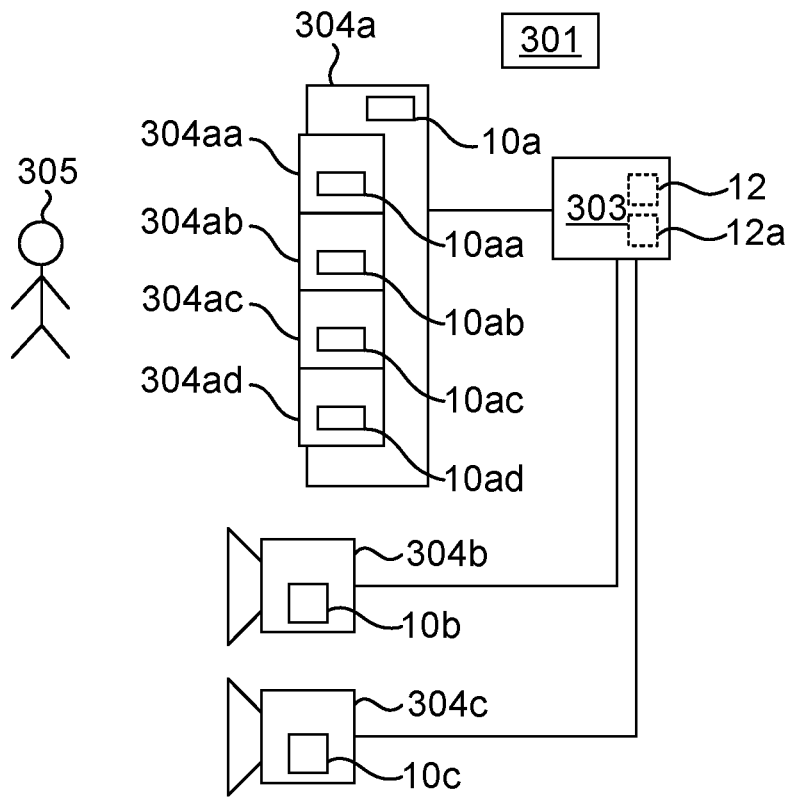
FIG. 12 is a schematic diagram illustrating an environment in which embodiments presented herein can be applied.
Figure 13:
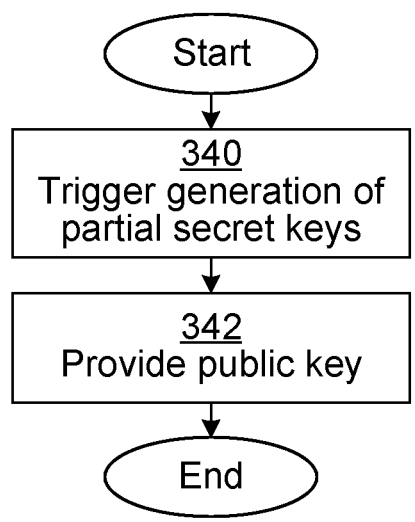
FIG. 13 is a flow chart illustrating embodiments of methods for providing biometric access control of a user.
Figure 14:
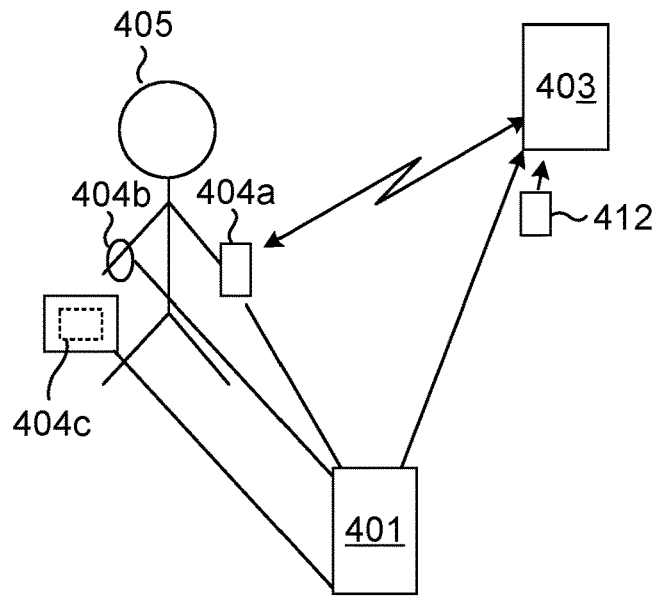
FIG. 14 is a schematic diagram illustrating an environment in which embodiments presented herein can be applied.
Figure 16:
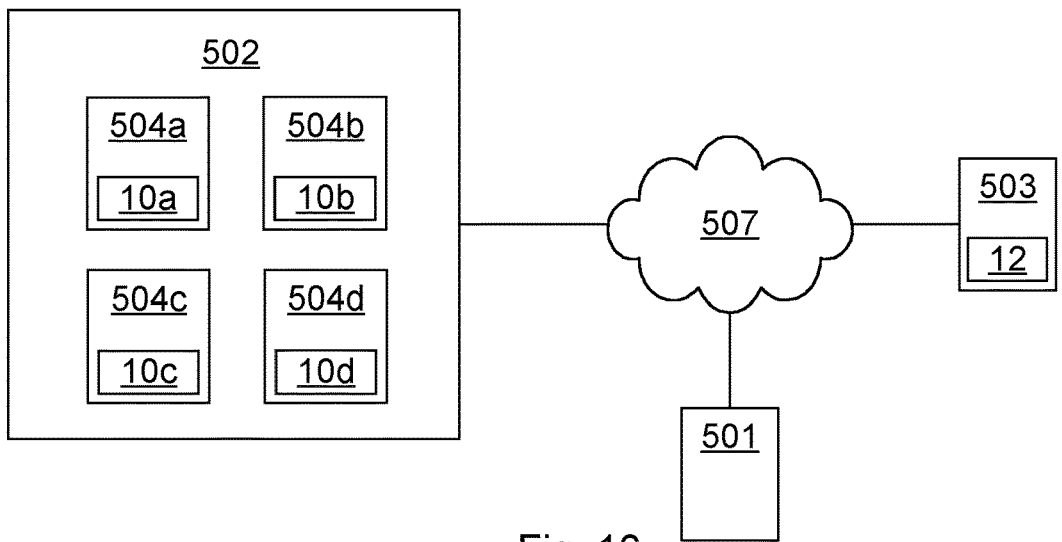
FIG. 16 is a schematic diagram illustrating an environment in which embodiments presented herein can be applied.

FIG. 4 is a schematic diagram illustrating components of the electronic device 2 of FIG. 1, the validation server 103 of FIG. 7, the recovery control device 201 of FIG. 9, the biometric control device 301 of FIG. 12, the coordinating user device 404a of FIG. 14, and/or the hardware integrity device 501 of FIG. 16. A processor 60 is provided using any combination of one or more of a suitable central processing unit (CPU), graphics processing unit (GPU), multiprocessor, microcontroller, digital signal processor (DSP), etc., capable of executing software instructions 67 stored in a non-volatile memory 71, which can thus be a computer program product. The processor 60 could alternatively be implemented using an application specific integrated circuit (ASIC), field programmable gate array (FPGA), etc. The processor 60 can be configured to execute the method described with reference to FIG. 3 above, the method described with reference to FIG. 8 below, the method described with reference to FIG. 10 below, the method described with reference to FIG. 13 below, or the method described with reference to 15 below, the method described with reference to FIG. 17 below.

The non-volatile memory 71 can be implemented using magnetic memory, optical memory, and/or solid-state memory. The non-volatile memory 71 stores the second partial secret 10b.

A volatile memory 70 is also provided for reading and/or storing data during execution of software instructions in the processor 70. The volatile memory 70 can e.g. be in the form of RAM. The volatile memory 70 can store the first partial secret key 10a.

An I/O interface 62 is provided for communicating with external and/or internal entities.

Other components of the electronic device 2 are omitted in order not to obscure the concepts presented herein.

Figure 5:
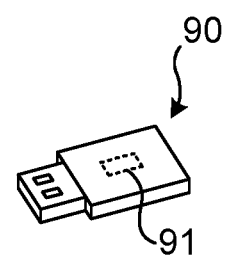
FIG. 5 shows one example of a computer program product comprising computer readable means.

FIG. 5 shows one example of a computer program product comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 71 of FIG. 4. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

Second Set of Embodiments

As we use more and more digital applications in our lives, cryptography continually increases in popularity and use cases for securing various parts of our digital interaction. There is symmetric and asymmetric cryptography with various advantages. For instance, asymmetric cryptography can be used both for proving identity (using cryptographic signing) and decrypting data addressed to a specific user.

Traditional asymmetric cryptography is based on a public key and a secret key. The public key is tied to an entity/user and is shared publicly. The secret key is tied to the same entity, but is kept secret. Using the secret key, the entity can e.g. apply a cryptographic signature that can be verified by anyone using the public key. The secret key can also be used to decrypt data that has been encrypted by someone using the public key.

Authentication of user devices can be performed in many ways, including asymmetric cryptography. An issue arises if the user device with the secret key is compromised, e.g. lost or stolen. If an attacker manages to get hold of the user device, the attacker may be able to perform illegitimate cryptographic operations. This can lead to serious financial or social implications for the user of the user device.

The legitimate user may thus want to block the use of the secret key of the device e.g. by invalidating the old key pair and generating a new key pair. However, in order to make this possible, all devices storing the previous public key must be informed of the new public key of the new key pair. This is of course a security risk, since missing only one device storing a previous public key opens up for the use by an attacker of the stolen device.

One object is to provide a way to block cryptographic operations by a user device that has been compromised, where no actions are required by devices holding the corresponding public key.

Embodiments in this set of embodiments are based on threshold cryptography, where two (i.e. both) of two available partial secret keys are needed for performing a cryptographic operation. One partial secret key is stored in the user device and one partial secret key is stored on a validation server. If the user device is compromised, the validation server is informed of this and blocks the user of its partial secret key for that user device. In this way, the user device is effectively blocked from any cryptographic operations since it is required that also the validation server applies its partial secret key for the cryptographic operation to occur.

Figure 6:
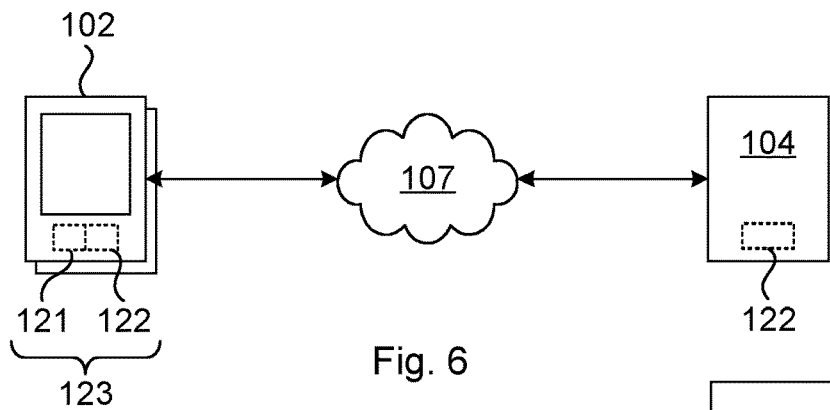
FIG. 6 is a schematic diagram illustrating how asymmetric cryptography operations can be performed in the prior art.

FIG. 6 is a schematic diagram illustrating how asymmetric cryptography operations can be performed in the prior art.

In traditional asymmetric cryptography there is a key pair 123 consisting of a public key 122 and a secret key 121. The public key 122 is associated with an entity or user and is shared publicly. The secret key 121 is coupled to the public key, but the secret key 121 is kept secret. Using the secret key 121, a user device 102 can perform a cryptographic operation, e.g. cryptographic signing or decryption.

In the example of FIG. 6, a user device 102, such as a smartphone, computer, wearable device, etc., stores the key pair 123 consisting of the public key 122 and the secret key 121. The user device 102 is connected to a communication network 107, such as the Internet. The public key 122 is shared and can thus e.g. be stored in an application server 104, that is also connected to the communication network 107. The application server 104 is any server with which the user device can interact, e.g. using an app (application) in the user device 102 or via a web browser.

In this way, the user device 102 can perform cryptographic operations, such as cryptographic signing or decryption, in cooperation with the application server 104. The application server 104 can also have its own key pair, consisting of a separate set of a public key and a secret key (not shown).

As mentioned in the background, this solution is vulnerable if the user device 102 is lost or stolen, in which case an attacker might be able to perform cryptographic operations using the stolen user device 102.

FIG. 7 is a schematic diagram illustrating an environment in which embodiments presented herein can be applied. The context is similar to that of FIG. 6, where a user device 102 interacts with an application server 104 over a communication network 107 to apply a cryptographic operation corresponding to a public key 12 available to the application server 104. Here, however, there is also a validation server 103. There is still a single public key 12, but instead of a single secret key, the secret key operations are performed using a threshold cryptography scheme based on a user partial secret key 10a, stored in the user device 102, and a server partial secret key 10b, stored in the validation server 103. It is to be noted that no single secret key corresponding to the public key 12 exists that could be stolen. Instead, secret cryptographic operations are achieved by separate utilisation of the partial secret keys 10a, 10b of the threshold cryptography scheme.

For a cryptographic operation to be applied, it is thus required that both partial secret keys 10a, 10b, are applied. In other words, in accordance with the nomenclature established above, a (2, 2) threshold scheme is applied for performing cryptographic operations.

For this solution, the partial signatures can e.g. be implemented by signing of JWT (JSON (JavaScript Object Notation) Web Token) with JWS (JSON Web Signature). An LDP (Linked Data Platform) server can then validate the signatures against a stored public key obtained during client registration.

FIG. 8 is a flow chart illustrating embodiments of methods for applying a server partial secret key conditional on blocked status. The server partial secret key 10b and a user partial secret key 10a form part of a threshold cryptography scheme 11 associated with a public key 12. The method is performed in a validation server 103. It is to be noted that from the perspective of the validation server 103, the method can be performed in parallel for respective user devices. In this case, the validation server 103 holds separate server partial secret keys for each user device.

In a receive request step 140, the validation server 103 receives a request to apply a server partial secret key 10b for a requested cryptographic operation for a user device 102. As mentioned above, the cryptographic operation can e.g. be to perform cryptographic signing and/or decryption, for interacting with the application server, e.g. for authorisation, etc.

In a conditional valid to apply partial secret key step 142, the validation server 103 evaluates whether the server partial secret key 10b can validly be applied by determining that the server partial secret key 10b is not blocked from being applied. In other words, the validation server 103 actively checks whether the server partial secret key 10b (of the user device for which the method is performed) is blocked from being applied. This validation can be performed in several different ways based on one or more conditions.

One condition that may need to be true for applying the server partial secret key 10b can be that a current time is within a pre-defined validity schedule. For instance, the partial secret key 10b can be scheduled to be applied only during office hours (e.g. for accessing work documents), weekdays or weekends.

One condition that may need to be true for applying the server partial secret key 10b can be that an application of the cryptographic operation complies with a pre-defines set of valid applications. Examples of such applications can be payments (lower than a set limit or without any limit), document signing, logging in to a set of preapproved services (e.g. web sites or application (app) services), etc.

When it is determined that the server partial secret key 10b can validly be applied, the method proceeds to an interact to apply partial secret keys step 144. Otherwise, the method proceeds to the optional receive message to block step 146, the method proceeds the optional obtain updated server partial secret key step 150, or the method ends.

In the interact to apply partial secret keys step 144, the validation server 103 interacts with the user device 102 to perform the requested cryptographic operation. This makes the user device 102 apply the user partial secret key 10a and the validation server apply the server partial secret key 10b. Threshold cryptography is employed such that at least two partial secret keys 10a-b of the threshold cryptography scheme 11 are required for the requested cryptographic operation. For instance, the threshold can be that two out of two partial secret keys 10a-b need to be applied or three out of three partial secret keys need to be applied. In any case, the threshold scheme is devised such that the server is required to apply its server partial secret key for performing the requested cryptographic operation, thereby forcing the check for potential blocking at the validation server.

Hence, as long as the validation is positive in step 142, the validation server applies its partial secret key, to support the cryptographic operation. In this way, the validation server 103 provides a conditional approval service for applying the server-side partial secret key for the user device 102.

In the optional receive message to block step 146, the validation server 103 receives 146 a message to block the server partial secret key 10b corresponding to a particular user device 102.

In an optional store block indication step 148, the validation server 103 stores 148 an indication that the server partial secret key 10b corresponding to the particular user device 102 is blocked. This indication will then block validation for that user device 102 in a subsequent iteration of step 142.

Hence, using steps 146 and 148, if the user device 102 is compromised, e.g. stolen or lost, the user can signal (directly or indirectly) to the validation server over a separate channel that the server partial secret key should be blocked for that user device, effectively blocking future validations (verified in step 142) In this way, if an attacker somehow manages to make the compromised user device apply its partial secret key for authentication, this is not sufficient, since the validation server has blocked its approval service for that user device.

In the optional obtain updated server partial secret key step 150, the validation server 103 obtains an updated server partial secret key, corresponding to an updated user partial secret key that collectively form part of the threshold cryptography scheme 11. The update in partial secret keys still correspond (collectively) to the public key 12. This update is also known as refresh (as described above) or key rotation.

An analogy of how the key rotation is now illustrated with a fictive, but easily understood, cryptographic operation of addition of the partial secret keys. In this case, both partial secret keys are added to a data item being a number n. The first partial secret key is denoted k1 and the second partial secret key is denoted k2. The fictive cryptographic operation involves respectively adding the partial secret keys to the number, resulting in n+k1+k2, a result which is verifiable by the public key. When the keys are updated, this can be achieved by adding an offset os to one partial secret key and subtracting the same offset os from the other partial secret key, resulting in updated secret keys (k1+os) and (k2−os). When both updated keys are applied to the number n, this results in n+ (k1+os)+ (k2−os)=n+k1+k2, i.e. the same result as before the update. It is thus clear how that, even after the update, the same public key can be used for verification. Significantly, one original partial secret key cannot be used in conjunction with the other partial secret key after the update, since, e.g. (k1+os)+k1≠k1+k2. In reality, the addition and subtraction can be much more complex operations, but the same principles apply.

Using the key rotation, only corresponding updated user partial secret keys can be used, effectively invalidating any previous instances of user partial secret keys, e.g. in a compromised user device.

The obtain updated server partial secret key step 150 can be performed as a result of receiving a message to block the server partial secret key 10b.

Alternatively, the obtain updated server partial secret key step 150 can be performed regularly based on a schedule, e.g. periodically based on a fixed period.

It is to be noted that the user partial secret key can, in turn, be based on a threshold scheme, e.g. a (2, 3) scheme of partial secret keys provided to a computer, a phone and a wearable device.

By applying the threshold cryptography scheme, verification of any cryptographic operation based on the public key can be performed as known in the art for a traditional key pair consisting of a public key and a secret key. In other words, no modification is required for verification of partial secret keys of a threshold scheme compared to traditional asymmetric cryptography. Moreover, blocking operations are enabled without the need for any exchange of public keys.

Here now follows a set of items for the second set of embodiments.

A1. A method for applying a server partial secret key conditional on blocked status, wherein the server partial secret key and a user partial secret key form part of a threshold cryptography scheme associated with a public key, the method being performed in a validation server, the method comprising:
receiving a request to apply a server partial secret key for a requested cryptographic operation for a user device;
determining that the server partial secret key can validly be applied by determining that the server partial secret key is not blocked from being applied; and
interacting with the user device to perform the requested cryptographic operation, such that the user device applies the user partial secret key and the validation server applies the server partial secret key, wherein a threshold of at least two partial secret keys of the threshold cryptography scheme are required for applying the threshold cryptography scheme for performing the requested cryptographic operation.

A2. The method according to item A1, wherein the determining that the server partial can validly be applied comprises determining that a current time is within a pre-defined validity schedule.

A3. The method according to any one of items A1 to A2, wherein the determining that the server partial secret key can validly be applied comprises determining that an application of the cryptographic operation complies with a pre-defines set of valid applications.

A4. The method according to any one of items A1 to A3, further comprising:
receiving a message to block the server partial secret key corresponding to a particular user device; and
storing an indication that the server partial secret key corresponding to the particular user device is blocked.

A5. The method according to any one of items A1 to A4, further comprising:
obtaining an updated server partial secret key, corresponding to an updated user partial secret key that collectively form part of the threshold cryptography scheme that, wherein the update in partial secret keys still correspond to the public key.

A6. The method according to item A5 when dependent on item A4, wherein obtaining an updated server partial secret key is performed as a result of receiving a message to block the server partial secret key.

A7. The method according to item A5, wherein the obtaining an updated server partial secret key is performed regularly based on a schedule.

A8. A validation server for applying a server partial secret key conditional on blocked status, wherein the server partial secret key and a user partial secret key form part of a threshold cryptography scheme associated with a public key, the validation server comprising:
a processor; and
a memory storing instructions that, when executed by the processor, cause the validation server to:
receive a request to apply a server partial secret key for a requested cryptographic operation for a user device;
determine that the server partial secret key can validly be applied by determining that the server partial secret key is not blocked from being applied; and
interact with the user device to perform the requested cryptographic operation, such that the user device applies the user partial secret key and the validation server applies the server partial secret key, wherein a threshold of two partial secret keys of the threshold cryptography scheme are required for applying the threshold cryptography scheme for performing the requested cryptographic operation.

A9. The validation server according to item A8, wherein the instructions to determine that the server partial secret key can validly be applied comprise instructions that, when executed by the processor, cause the validation server to determine that a current time is within a pre-defined validity schedule.

A10. The validation server according to any one of items A8 or A9, wherein the instructions to determine that the server partial secret key can validly be applied comprise instructions that, when executed by the processor, cause the validation server to determine that an application of the cryptographic operation complies with a pre-defines set of valid applications.

A11. The validation server according any one of items A8 to A10, further comprising instructions that, when executed by the processor, cause the validation server to:
receive a message to block the server partial secret key corresponding to a particular user device; and
store an indication that the server partial secret key corresponding to the particular user device is blocked.

A12. The validation server according to any one of items A8 to A11, further comprising instructions that, when executed by the processor, cause the validation server to:
obtain an updated server partial secret key, corresponding to an updated user partial secret key that collectively form part of the threshold cryptography scheme that, wherein the update in partial secret keys still correspond to the public key.

A13. The validation server according to item A12 when dependent on item A11, further comprising instructions that, when executed by the processor, cause the validation server to execute the instructions to obtain an updated server partial secret key are as a result of receiving a message to block the server partial secret key.

A14. The validation server according to item A12, further comprising instructions that, when executed by the processor, cause the validation server to execute the instructions to obtain an updated server partial secret key regularly based on a schedule.

A15. A computer program for applying a server partial secret key conditional on blocked status, wherein the server partial secret key and a user partial secret key form part of a threshold cryptography scheme associated with a public key, the computer program comprising computer program code which, when executed on a validation server causes the validation server to:

receive a request to apply a server partial secret key for a requested cryptographic operation for a user device;

determine that the server partial secret key can validly be applied by determining that the server partial secret key is not blocked from being applied; and interact with the user device to perform the requested cryptographic operation, such that the user device applies the user partial secret key and the validation server applies the server partial secret key, wherein a threshold of at least two partial secret keys of the threshold cryptography scheme are required for applying the threshold cryptography scheme for performing the requested cryptographic operation.

A16. A computer program product comprising a computer program according to item A15 and a computer readable means comprising non-transitory memory in which the computer program is stored.

Third Set of Embodiments

Almost every person today has access to electronic devices with login accounts. Sometimes, the passcode or password for a device is lost or forgotten. To regain access, reset links can often be sent to a pre-registered e-mail address. But the user may have lost access also to the pre-registered e-mail address. Services often then apply the use of previously answered personal question, such as "what was your mother's maiden name?", "who was your favourite teacher in primary school?" or "what was the name of your first pet?". This poses another problem, since there are often multiple questions to answer, and while your mother's maiden name may be remembered, the favourite teacher might not be so conclusively remembered, or you may not remember if you originally counted your goldfish as a five-year old as your first pet or the dog that your family got when you were eight years old. These problems are only aggravated by the fact that often years have passed since the account was opened and these validation questions were first answered.

It is thus a real problem of recovering access to a user account without having access to a specific e-mail address or needing to remember the answers to detailed questions.

One object is to provide a more convenient yet secure way to regain access to a user account.

Embodiments of the third set allow recovery of a user account based on threshold cryptography. As explained in more detail above with reference to FIG. 2, the use of threshold cryptography enables authorisation of an action based on any t number of n partial secret keys being applied. To set this up (prior to the credentials for the user account being lost), n trusted recovery devices generate their respective partial secret keys. For recovery of the credentials, any t out of the n trusted recovery devices need to apply their partial signature. For instance, 3 out of 5 trusted recovery devices can apply their signature for recovery of a user account e.g. for accessing a smartphone when the passcode has been lost. The trusted recovery devices can e.g. be other devices of the user and/or devices of family members or trusted friends.

FIG. 9 is a schematic diagram illustrating an environment in which embodiments presented herein can be applied. A user device 202 of a user 205 can be any suitable electronic device, e.g. a smartphone, mobile phone, wearable device, tablet computer, laptop computer, desktop computer, etc.

The user device 202 is connected to a communication network 207, such as the Internet. There are also a number of at least partly trusted recovery devices 204a-g. The recovery devices can be under control of the user 205 and/or can be devices of friends or family of the user 205. The recovery devices 204a-g can be any type of electronic device, e.g. smartphones, computers, wearable devices, IoT (Internet of Things) devices, such as home speakers, light bulbs, sensors, fridge, etc.

A recovery control device 201 is used to allow the user 205 to regain access to a user account, e.g. for accessing the user device 202 or a service provided by a server 203 (e.g. as a web service or an app-based service). The access to the user account could have been lost e.g. if a credential, such as a passcode or password, is lost by the user or if the user 205 passes away and surviving family members need access to the user account. Prior to the credential being lost, the user 205 initiates the recovery possibility, which causes a recovery threshold cryptography scheme to be set up and the partial secret keys 10a-g being generated, respectively, by each one of the recovery devices 204a-g. A public key 12 of the threshold cryptography scheme is provided to the recovery control device 201. The recovery control device 201 can also be a recovery device itself.

As explained in more detail below, if the user 205 subsequently loses access to the user account (e.g. by losing the passcode for accessing the user device 202, access can be recovered if a predetermined number of the recovery devices 204a-g apply their respective partial secret keys, which can be verified against the public key 12 in the recovery control device 201, resulting in access being granted to the user account. At that point, a new everyday authentication can be selected, e.g. based on biometrics or passcode/password.

Figure 10:
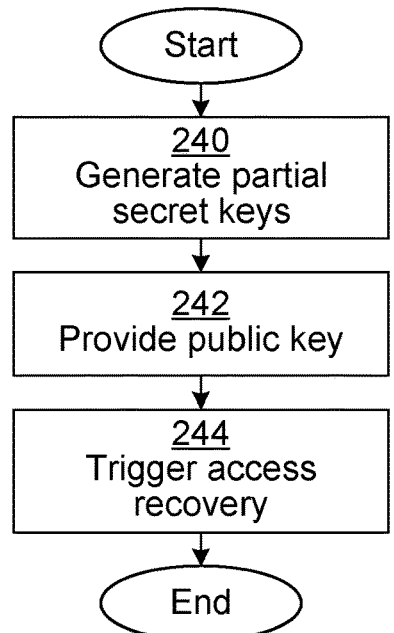
FIG. 10 is a flow chart illustrating embodiments of methods for recovering access to a user account.

FIG. 10 is a flow chart illustrating embodiments of methods for recovering access to a user account. The method is performed by a recovery control device 201.

In a trigger generation of partial secret keys step 240, the recovery control device 201 triggers generation of a plurality of partial secret keys 10a-g by respective recovery devices 204a-g. The plurality of partial secret keys form part of a threshold cryptography scheme 11 associated with a public key 12. It is to be noted that the coordination does not require any hierarchical relationship; the coordination can imply that the recovery control device participates in the generation of the partial secret keys along with the recovery device 204a-g. The threshold cryptography scheme 11, and thus also the public key 12, are both associated with the user account. As explained above, the recovery devices 204a-g can be devices of the user (of the user account) and/or devices belonging to family or trusted friends.

As explained above, the threshold cryptography scheme 11 can e.g. be based on an Elliptic Curve Digital Signature Algorithm (ECDSA).

In a provide public key step 242, the recovery control device 201 provides the public key 12 to an access verification device 201, 202, 203. The access verification device can be the device that verifies access normally, and can be e.g. the user device 202, an application server 203 or it could also be combined with the role of the recovery control device 201.

After step 242, the next step can occur much later, at a point in time when access to the user account is to be recovered.

In a trigger access recovery step 244, the recovery control device 201 triggers an access recovery. This can be based on the user requesting the recovery, in a similar way to a 'lost password' action. When the access recovery is triggered, access recovery messages are transmitted (e.g. by the recovery control device 201 or by another entity by request from the recovery control device 201) to the recovery devices 204a-g. In order to recover access to the user account, the threshold number of the plurality of partial secret keys 10a-g are required to be applied in the threshold cryptography scheme 11. Each recovery device 204a-g can prompt the user of that device whether to apply its partial secret key 10a-g, which the user can then approve, optionally after a separate authentication of the user of the respective device 204a-g.

The threshold number can be less than the plurality of partial secret keys 10a-g, whereby not all of the recovery devices 204a-g need to apply their respective partial secret keys 10a-g, as this might not be possible (e.g. if somebody has lost or lost access to their recovery device 204a-g or that person is not available at the time). The threshold number is equal to or greater than two. This ensures that no single recovery device can be used to recover the user account, which could otherwise pose a security risk.

When the threshold number of the plurality of partial secret keys 10a-g have been applied, the device verifying the user access checks against the public key and approves access to the user account. It is to be noted that the public key verification can be performed identically to traditional (non-threshold) asymmetric cryptography.

Using the embodiments presented herein a convenient and secure solution is provided for recovering access to a user account, e.g. if the user loses the credential to the device or the user passes away.

A secure way to recover an account is thus provided where no details need to be remembered by the user other than what devices, or what family members or friends, have been given the partial secret keys.

FIGS. 11A-D are schematic diagrams illustrating embodiments of where the recovery control device 201 can be implemented.

Figure 11A:
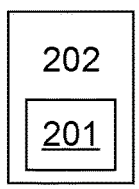
FIGS. 11A-D are schematic diagrams illustrating embodiments of where the recovery control device of FIG. 9 can be implemented.

In FIG. 11A, the recovery control device 201 shown as implemented in the user device 202. The user device 202 is thus the host device for the recovery control device 201 in this implementation.

Figure 11B:
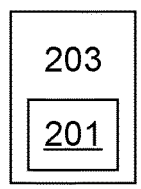

In FIG. 11B, the recovery control device 201 shown as implemented in a server 203, such as an application server for providing a web service or supporting an app. The server 203 is thus the host device for the recovery control device 201 in this implementation.

Figure 11C:
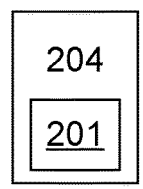

In FIG. 11C, the recovery control device 201 shown as implemented in a recovery device 204, e.g. one of the recovery devices illustrated in FIG. 9. The recovery device 204 is thus the host device for the recovery control device 201 in this implementation.

Figure 11D:
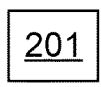

In FIG. 11D, the recovery control device 201 is shown as implemented as a stand-alone device. The recovery control device 201 thus does not have a host device in this implementation.

Here now follows a set of items for the third set of embodiments.

B1. A method for recovering access to a user account, the method being performed by a recovery control device, the method comprising:

triggering generation of a plurality of partial secret keys by respective recovery devices, the plurality of partial secret keys forming part of a threshold cryptography scheme associated with a public key, wherein the threshold cryptography scheme is associated with the user account;

providing the public key to an access verification device; and triggering an access recovery, whereby access recovery messages are transmitted to the recovery devices, wherein a threshold number of the plurality of partial secret keys are required to be applied in the threshold cryptography scheme for recovering access to the user account.

B2. The method according to item B1, wherein the threshold number is less than the plurality of partial secret keys.

B3. The method according to item B1 or B2, wherein the threshold number is equal to or greater than two.

B4. The method according to any one of items B1 to B3, wherein the threshold cryptography scheme is based on an Elliptic Curve Digital Signature Algorithm, ECDSA.

B5. A recovery control device for recovering access to a user account, the recovery control device comprising:

a processor; and a memory storing instructions that, when executed by the processor, cause the recovery control device to:

trigger generation of a plurality of partial secret keys by respective recovery devices, the plurality of partial secret keys forming part of a threshold cryptography scheme associated with a public key, wherein the threshold cryptography scheme is associated with the user account;

provide the public key to an access verification device; and trigger an access recovery, whereby access recovery messages are transmitted to the recovery devices, wherein a threshold number of the plurality of partial secret keys are required to be applied in the threshold cryptography scheme for recovering access to the user account.

B6. The recovery control device according to item B5, wherein the threshold number is less than the plurality of partial secret keys.

B7. The recovery control device according to item B5 or B6, wherein the threshold number is equal to or greater than two.

B8. The recovery control device according to any one of items B5 to B7, wherein the threshold cryptography scheme is based on an Elliptic Curve Digital Signature Algorithm, ECDSA.

B9. A computer program for recovering access to a user account, the computer program comprising computer program code which, when executed on a recovery control device causes the recovery control device to:

trigger generation of a plurality of partial secret keys by respective recovery devices, the plurality of partial secret keys forming part of a threshold cryptography scheme associated with a public key, wherein the threshold cryptography scheme is associated with the user account;

provide the public key to an access verification device; and trigger an access recovery, whereby access recovery messages are transmitted to the recovery devices, wherein a threshold number of the plurality of partial secret keys are required to be applied in the threshold cryptography scheme for recovering access to the user account.

B10. A computer program product comprising a computer program according to item B9 and a computer readable means comprising non-transitory memory in which the computer program is stored.

Fourth Set of Embodiments

In the prior art, biometric sensors, such as fingerprint scanners, face detectors or iris scanners, can be used in electronic locks for controlling access to restricted physical spaces or to electronic devices, such as a smartphones or computers. On occasion, biometric sensors fail to correctly authenticate a legitimate person, e.g. due to noise, incorrect reading or modified physical characteristics of the user. If this happens, it can be a frustrating situation for the legitimate person who needs access.

In the prior art, if biometric authentication fails, it is known to provide an alternative authentication mechanism, such as using an electronic key or passcode. However, it would be of great convenience if the need for such an alternative authentication mechanism would be greatly reduced.

One object is to improve reliability of biometric authentication.

Embodiments of the fourth set provide biometric authentication access control based on threshold cryptography. As explained in more detail with reference to FIG. 2 above, the use of threshold cryptography enables authorisation based on any t number of n partial secret keys being applied. To set this up, partial keys are assigned to n biometric reading devices. Each biometric reading device can e.g. be based on face recognition, iris recognition, finger recognition (for each finger of for reading of all fingers), voice recognition, etc. For authentication, any t out of the n biometric reading devices need to authorise the user and their partial signatures then need to be applied. For instance, a scheme can be set up where authentication of 2 out of 3 biometric reading devices can be sufficient for granting access. By only requiring a subset of confirmed biometric reading devices for granting access, a balance is provided between convenience and security. Moreover, the threshold can be set to a level that is appropriate for each application.

FIG. 12 is a schematic diagram illustrating an environment in which embodiments presented herein can be applied. A user 305 is faced with a plurality of biometric reading devices 304a-c, 304aa-ad. For instance, a first biometric reading device 304a is a fingerprint scanner, provided for reading fingerprints for matching against templates of people that should be granted access. The fingerprint scanner 304a is in turn made up of several individual biometric reading devices 304aa-ad for individual fingers. The fingerprint captured by each biometric reading devices 304aa-ad is compared to templates of authenticated users. In this example, there are four such individual biometric reading devices 304aa-ad for four fingers, but fewer or more individual biometric reading devices could be provided.

A second biometric reading device 304b is in the form of an iris scanner. The iris scanner captures an image of the iris of the user 305 and compares the captured image against one or more templates of authenticated users.

A third biometric reading device 304c is in the form of a face scanner. The face scanner captures a 2D or 3D image of the face of the user 305 and compares the captured images against one or more templates of authenticated users.

Optionally, additional or alternative biometric reading devices can also be provided, e.g. voice recognition, gait recognition, etc.

A biometric control device 301 generates partial secret keys 10a-c, 10aa-ad and provides these to the various biometric reading devices 304a-c, 304aa-ad. The biometric control device 301 generates a corresponding public key 12 and provides this to a verification device 303. The verification device 303 is the device that controls access, e.g. physical access controlled by an electronic lock or access to an electronic device, such as a computer or smartphone, based on biometric readings from the biometric reading devices 304a-c, 304aa-ad. It is to be noted that one or more of the biometric reading devices 304a-c, 304aa-ad can physically be part of the verification device. Optionally, also the biometric control device 301 can form part of the verification device 303. In one embodiment, the biometric control device 301, the verification device 303 and the biometric reading devices 304a-c, 304aa-ad all form part of the same physical device, such as an electronic lock.

As explained in more detail below, in order to grant access, a predetermined number of the partial secret keys 10a-c, 10aa-ad need to be applied (which occurs when the corresponding biometric reading device authorises the user 305), which can be verified against the public key 12 in the verification device 303, resulting in access being granted to the user account.

FIG. 13 is a flow chart illustrating embodiments of methods for providing biometric access control of a user 305. The method is performed by a biometric control device 301.

In a trigger generation of partial secret keys step 340, the biometric control device 301 triggers generation of a plurality of partial secret keys 10a-c, 10aa-ad for respective biometric reading devices (304a-c, 304aa-ad). The generation of the partial secret keys can be performed in the respective biometric reading devices or in another device. When generated in another device, the partial secret key is transferred securely to the respective biometric reading device, e.g. over a secure (e.g. encrypted) channel or in a secure environment. The partial secret keys form part of a threshold cryptography scheme 11 associated with a public key 12. A threshold number of the plurality of partial secret keys 10a-c, 10aa-ad are required to be applied in the threshold cryptography scheme 11 for verification against the public key 12. The threshold number of partial secret keys 10a-c, 10aa-ad can be applied to apply a digital signature corresponding to the public key, indicating that a user is authenticated and should be granted access (e.g. to a physical space or an electronic device).

Different biometric reading devices can be given different importance. One way to implement this is that different weights are given to different biometric reading devices. At least one of the plurality of different biometric reading devices is then given increased weight in the cryptography scheme 11 by being assigned a plurality of partial secret keys 10a-c, 10aa-ad. In this way if, for instance, facial recognition is considered more secure, the facial recognition device can be given two or more partial secret keys to apply upon successful facial recognition. At the same time e.g. gait recognition could be assigned only a single secret key.

Another way to provide a more fine-tuned approach for applying the partial secret keys is to arrange a hierarchy, such that one partial secret key is, in turn, made up of a set of subordinate partial secret keys. In other words, at least one of the plurality of partial secret keys 10a-c forms a subordinate threshold cryptography scheme with an associated subordinate public key 12a. A threshold number of a plurality of subordinate partial secret keys 10aa-ad are required to be applied in the subordinate threshold cryptography scheme 11' for verification against the subordinate public key 12a. The subordinate public key 12a is provided to the verification device 303. Each one of the subordinate partial secret keys 10aa-ad is assigned to be applied for a different biometric reading device 304aa-ad. For example, a (collective) fingerprint recognition partial secret key 10a can be made up of subordinate partial secret keys 10aa-ad, where e.g. three of four fingers need to be authorised for the partial secret key 10a for the fingerprint recognition to be applied. Alternatively, it is also possible that all individual biometric reading devices for each finger applies its own partial secret key 10aa-ad on the same level hierarchically as the other partial secret keys 10b-c. In this case, there is no need for a partial secret key for the fingerprint biometric reading device as a whole.

The threshold number can be less than the plurality of partial secret keys 10a-c, 10aa-ad, to allow grant of access when one or more biometric reading devices is not successful in recognising the user. The threshold number can be equal to or greater than two. This improves security, since at least two biometric reading devices need to authorise the user for granting access.

As explained above, the threshold cryptography scheme 11 can e.g. be based on an Elliptic Curve Digital Signature Algorithm (ECDSA).

The plurality of partial secret keys 10a-c, 10aa-ad are assigned to be applied for a plurality of different biometric reading devices 304a-c, 304aa-ad. It is to be noted that the partial secret keys 10a-c, 10aa-ad do not need to be associated with a particular user. Instead, each partial secret key 10a-c, 10aa-ad is associated with the biometric reading device 304aa-ad and is applied by the biometric reading device in question when a user is authenticated, e.g. based on preregistered templates of authorised users.

In a provide public key step 342, the biometric control device 301 provides the public key 12 to a verification device 303. This allows the verification device 303 to verify the authentication, e.g. based on traditional public key-based signature verification.

When the threshold number of the plurality of partial secret keys 10a-c, 10aa-ad have been applied, e.g. to electronically sign an indication of authentication, the verification device 303 checks against the public key 12 and grants access. The indication of authentication can be provided by the verification device and can include a timestamp, to prevent a replay attack, since the timestamp would not validly be the same over time. It is to be noted that the public key verification can be performed identically to traditional (non-threshold) asymmetric cryptography.

When applied for physical access control, different electronic locks can have different thresholds. For instance, a perimeter lock can be configured to be relatively easy to enter, i.e. the threshold t is relatively small, whereas access to more secure interior spaces can configured to be relatively difficult to enter, i.e. the threshold tis relatively large. This provides an excellent tool for adjusting the security level, hence fitting with assurance levels (basic, substantial and high) of the European Cybersecurity Act.

A user can thus be granted access to protected physical space or protected electronic device without needing any physical key device. Furthermore, the accuracy is not always perfect with biometric sensors, whereby access can still be granted e.g. if one sensor fails to authenticate the user, leading to more reliable and dependable authentication.

Hence, using the embodiments presented herein, a convenient and secure solution is provided for improving biometric access control.

Here now follows a set of items for the fourth set of embodiments.

C1. A method for providing biometric access control of a user, the method being performed by a biometric control device, the method comprising:

triggering generation of a plurality of partial secret keys for respective biometric reading devices, the plurality of secret keys forming part of a threshold cryptography scheme associated with a public key, wherein a threshold number of the plurality of partial secret keys are required to be applied in the threshold cryptography scheme for verification against the public key; and providing the public key to a verification device.

C2. The method according to item C1, wherein at least one of the plurality of different biometric reading devices is given increased weight in the cryptography scheme by being assigned a plurality of partial secret keys.

C3. The method according to item C1 or C2, wherein at least one of the plurality of partial secret keys forms a subordinate threshold cryptography scheme with an associated subordinate public key wherein a threshold number of a plurality of subordinate partial secret keys are required to be applied in the subordinate threshold cryptography scheme for verification against the subordinate public key; wherein each one of the subordinate partial secret keys is assigned to be applied for a different biometric reading device.

C4. The method according to any one of items C1 to C3, wherein the threshold number is less than the plurality of partial secret keys.

C5. The method according to any one of items C1 to C4, wherein the threshold number is equal to or greater than two.

C6. The method according to any one of items C1 to C5, wherein the threshold cryptography scheme is based on an Elliptic Curve Digital Signature Algorithm, ECDSA.

C7. A biometric control device for providing biometric access control of a user, the biometric control device comprising:

a processor; and a memory storing instructions that, when executed by the processor, cause the biometric control device to:

trigger generation of a plurality of partial secret keys for respective biometric reading devices, the plurality of secret keys forming part of a threshold cryptography scheme associated with a public key, wherein a threshold number of the plurality of partial secret keys are required to be applied in the threshold cryptography scheme for verification against the public key; and provide the public key to a verification device.

C8. The biometric control device according to item C7, wherein at least one of the plurality of different biometric reading devices is given increased weight in the cryptography scheme by being assigned a plurality of partial secret keys.

C9. The biometric control device according to item C7 or C8, wherein at least one of the plurality of partial secret keys forms a subordinate threshold cryptography scheme with an associated subordinate public key wherein a threshold number of a plurality of subordinate partial secret keys are required to be applied in the subordinate threshold cryptography scheme for verification against the subordinate public key; wherein each one of the subordinate partial secret keys is assigned to be applied for a different biometric reading device.

C10. The biometric control device according to any one of items C7 to C9, wherein the threshold number is less than the plurality of partial secret keys.

C11. The biometric control device according to any one of items C7 to C10, wherein the threshold number is equal to or greater than two.

C12. The biometric control device according to any one of items C7 to C11, wherein the threshold cryptography scheme is based on an Elliptic Curve Digital Signature Algorithm, ECDSA.

C13. A computer program for providing biometric access control of a user, the computer program comprising computer program code which, when executed on a biometric control device causes the biometric control device to:

trigger generation of a plurality of partial secret keys for respective biometric reading devices, the plurality of secret keys forming part of a threshold cryptography scheme associated with a public key, wherein a threshold number of the plurality of partial secret keys are required to be applied in the threshold cryptography scheme for verification against the public key; and provide the public key to a verification device.

C14. A computer program product comprising a computer program according to item C13 and a computer readable means comprising non-transitory memory in which the computer program is stored.

Fifth Set of Embodiments

Locks and keys are evolving from the traditional pure mechanical locks. These days, electronic locks are becoming increasingly common. For electronic locks, no mechanical key profile is needed for authentication of a user. The electronic locks can e.g. be opened using an electronic key stored on a special carrier (fob, card, etc.) or in a smartphone. The electronic key and electronic lock can e.g. communicate over a wireless interface. Such electronic locks provide a number of benefits, including improved flexibility in management of access rights, audit trails, key management, etc.

For increased security, it is sometimes desired to verify that multiple user devices are present to open the lock. However, implementing such a solution can be complicated.

One object is to provide a more flexible way to provide access control based on several user devices, that is simple to implement on the verifier side.

Embodiments of the fifth set provide access control based on threshold cryptography. As explained in more detail with reference to FIG. 2 above, the use of threshold cryptography enables authorisation based on any t number of n partial secret keys being applied. To set this up, partial secret keys are respectively generated by n user devices. Each user device can apply its partial secret key based on its own authentication, e.g. face recognition, passcode, fingerprint recognition, or even no local authentication. For authentication with an access control device on the lock side, any t out of the n user devices need to apply their partial signatures. For instance, a scheme can be set up where authentication of 2 out of 3 user devices can be sufficient for granting access. The applying of partial signatures is coordinated by one coordinating user device, which also communicates with the access control device. The verification on the access control device side is conveniently performed using a single public key, requiring very little implementation effort (or none at all) on the access control device side.

FIG. 14 is a schematic diagram illustrating an environment in which embodiments presented herein can be applied. A user 405 can carry a plurality of user devices 404a-c. For instance, a first user device 404a can be a smartphone, a second user device 404b can be a wearable device (e.g. a smartwatch), and a third user device can be a tablet computer. It is to be noted that all communication between entities herein can be Internet protocol (IP) based communication over local communication links, such as a local area network (LAN), Wi-Fi, Bluetooth, Bluetooth low energy (BLE), and/or over a wide area network such as the Internet and/or over a cellular network.

Optionally, additional or alternative user devices can also be provided, e.g. a computer, etc.

A key trigger device 401 triggers the generation of partial secret keys 10a-c by the various user devices 404a-c. The key trigger device 401 ensures the generation of a corresponding public key 12 and provides this to an access control device 403. The access control device 403 is the device that controls access, e.g. physical access controlled by an electronic lock or access to an electronic device, such as a computer, based the user devices 404a-c. Optionally, the key trigger device 401 can form part of the access control device 403.

As explained in more detail below, in order to grant access, a predetermined threshold number of the partial secret keys 10a-c need to be applied (which can occur when the corresponding user device authorises the user 405), to a data item. When the threshold number of partial secret keys have been applied, this can be verified against the public key 12 by the access control device 403, resulting in access being granted. When access is granted, the access control device 403 can send an unlock signal to an electronic lock 412 to open, after which the user 405 can open the door or other openable physical barrier (e.g. gate, drawer, locker, etc.) that is secured by the electronic lock 412.

A coordinating user device 404a coordinates the process of the multiple user devices 404a-c applying their respective partial secret keys, whereby the access control device 403 only needs to communicate with the coordinating user device 404a for the threshold cryptography. In this way, the threshold cryptography scheme is transparent for the access control device 403, since the access control device 403 can simply verify against the public key 12, as in traditional asymmetric cryptography. It is to be noted that the coordinating user device can optionally vary between instances. For instance, on one occasion, it may be the first user device 404a that is the coordinating user device, while on another occasion, it is the third user device 404c.

Figure 15:
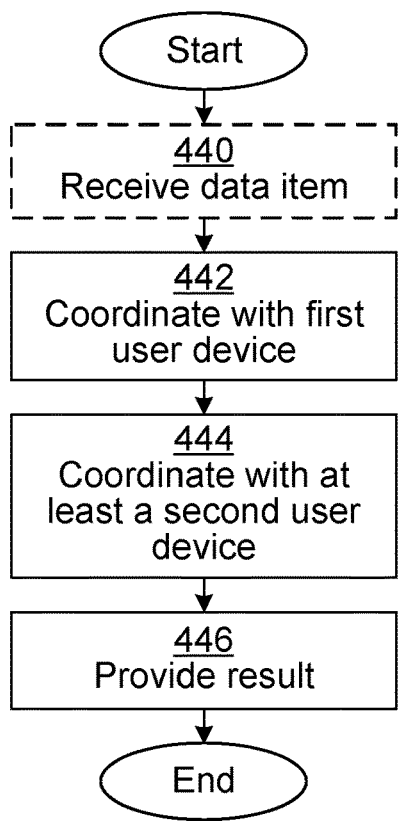
FIG. 15 is a flow chart illustrating embodiments of methods for authenticating with an access control device.

FIG. 15 is a flow chart illustrating embodiments of methods for authenticating with an access control device. The method is performed by a coordinating user device 404a.

In an optional receive data item step 440, the coordinating user device 404a receives a data item from the access control device. The data item can be used in the subsequent coordinate with first user device step 442 and coordinate with at least a second user device step 444, wherein the applying comprises cryptographically signing the data item using the respective partial secret keys. The data item can be generated by the access control device 403, such that the data item comprises a newly generated random, or difficult to guess, number, to ensure that the subsequent application of signature is recently applied and to prevent a replay attack.

In a coordinate with first user device step 442, the coordinating user device 404*a* coordinates with a first user device to apply a first partial secret key 10*a*, associated with the first user device 404*a*, to a data item, e.g. by cryptographically signing the data item using the first partial secret key 10*a*. The first partial secret key 10*a* is part of a set of partial secret keys of a threshold cryptography scheme 11 associated with a public key 12. In the threshold cryptography scheme 11, a threshold number of the set of partial secret keys are required to be applied for verification against the public key 12. In one embodiment, the first user device is the coordinating user device, in which case the coordinating in this step is internal processing within the coordinating user device. Alternatively, the first user device can be a user device other than the coordinating user device, e.g. when the coordinating user device can e.g. be a smartphone and the first user device, and the second user device (see below) can be smartcards or other devices with more limited resources than the smartphone but that are able to communicate with the smartphone.

The threshold cryptography scheme 11 can be configured such that the threshold number is less than the set of partial secret keys 10*a-c*, 10*ba-bc* to allow grant of access when one or more user devices is not available. Alternatively or additionally, the threshold number can be equal to or greater than two. This improves security, since at least two user devices are needed for the authentication for granting access. As mentioned above, the threshold cryptography scheme 11 can be based e.g. on an Elliptic Curve Digital Signature Algorithm, ECDSA.

The threshold cryptography scheme 11 can have a more complex structure, if needed, to define how access should be granted and how much weight should be given to each user device. For instance, at least one of the user devices 404*a-c* can be given increased weight in the cryptography scheme 11 by being assigned a plurality of partial secret keys. Alternatively or additionally, at least one partial secret key of the set of partial secret keys 10*a-c* can form a subordinate threshold cryptography scheme with an associated subordinate public key. A threshold number of a set of subordinate partial secret keys 10*ba-bc* are then required to be applied in the subordinate threshold cryptography scheme for verification against the subordinate public key. As an example of a scenario where this can be useful, consider a bank deposit box, where, at a top level, both a bank employee and a family member need to apply the respective partial secret keys. The bank employee simply applies a partial secret key using her/his user device. For the family member approval, this can be implemented by a subordinate threshold cryptography scheme where it is sufficient that at least two of the n family members (i.e. a threshold of 2 out of n) apply their partial secret key.

In a coordinate with at least a second user device step 444, the coordinating user device 404*a* coordinates with at least a second user device 404*a* to apply the second partial secret key 10*b* to the data item, e.g. by cryptographically signing the data item using the second partial secret key 10*b*. The second partial secret key 10*b* forms part of the set of partial secret keys, and thus forms part of the same threshold cryptography scheme 11 as the first partial secret key 10*a*. This step can be expanded to more user devices. For instance, this step can comprise requesting a third user device 404*c* to apply a third partial secret key 10*c* to the data item. In this case, the third partial secret key 10*c* also forms part of the set of partial secret keys and thus also forms part of the threshold cryptography scheme 11. More user devices can be added in the same way if desired.

In a communicate with access control device step 446, the coordinating user device 404*a* communicates with the access control device 403 to allow the access control device (3) to verify the threshold cryptography application using the public key 12. When step 440 is performed this involves (at least eventually) providing a signature of the data item, applied by the threshold number of partial secret keys. This allows the access control device 403 to verify the authentication against the public key 12 of the threshold cryptography scheme 11.

It is to be noted that the coordinating with (at least) the first and second user devices in steps 442 and 444, as well as the communication with the access control device in step 446 can each comprise multiple messages, in one or several rounds of communication.

Hence, using the embodiments presented herein, a convenient and secure solution is provided for improving flexible access control based on multiple user devices. By having the coordinating user device to coordinate the application of the partial secret keys, the solution can easily be implemented e.g. in a smartphone. On the access control device side, only verification against a public key is needed, whereby in many cases the access control device does not need to be modified at all to implement this flexible threshold cryptography solution.

Here now follows a set of items for the fifth set of embodiments.

D1. A method for authenticating with an access control device, the method being performed by a coordinating user device, the method comprising:

coordinating with a first user device to apply a first partial secret key, associated with the first user device, to a data item, wherein the first partial secret key is part of a set of partial secret keys of a threshold cryptography scheme associated with a public key, wherein a threshold number of the set of partial secret keys are required to be applied in the threshold cryptography scheme for verification against the public key;

coordinating with at least a second user device to apply the second partial secret key to the data item, wherein the second partial secret key forms part of the set of partial secret keys; and communicating with the access control device to allow the access control device to verify the threshold cryptography application using the public key.

D2. The method according to item D1, wherein the first user device is the coordinating user device.

D3. The method according to item D1 or D2, further comprising, prior to the applying the first partial secret key:

receiving a data item from the access control device, wherein the data item is used in the coordinating with the first user device and in the coordinating with at least a second user device to apply the second partial secret key to the data item, wherein the applying comprises cryptographically signing the data item using the respective partial secret keys.

D4. The method according to any one of items D1 to D3, wherein the coordinating with the at least the second user device comprises requesting a third user device to apply a third partial secret key to the data item, wherein the third partial secret key forms part of the set of partial secret keys.

D5. The method according to any one of items D1 to D4, wherein at least one of the user devices is given increased weight in the cryptography scheme by being assigned a plurality of partial secret keys.

D6. The method according to any one of items D1 to D5, wherein at least one partial secret key of the set of partial secret keys forms a subordinate threshold cryptography scheme with an associated subordinate public key wherein a threshold number of a set of subordinate partial secret keys are required to be applied in the subordinate threshold cryptography scheme for verification against the subordinate public key.

D7. The method according to any one of items D1 to D6, wherein the threshold number is less than the set of partial secret keys.

D8. The method according to any one of items D1 to D7, wherein the threshold number is equal to or greater than two.

D9. The method according to any one of items D1 to D8, wherein the threshold cryptography scheme is based on an Elliptic Curve Digital Signature Algorithm, ECDSA.

D10. A coordinating user device for authenticating with an access control device, the coordinating user device comprising:
a processor; and
a memory storing instructions that, when executed by the processor, cause the coordinating user device to:
coordinate with a first user device to apply a first partial secret key, associated with the first user device, to a data item, wherein the first partial secret key is part of a set of partial secret keys of a threshold cryptography scheme associated with a public key, wherein a threshold number of the set of partial secret keys are required to be applied in the threshold cryptography scheme for verification against the public key;
coordinate with at least a second user device to apply the second partial secret key to the data item, wherein the second partial secret key forms part of the set of partial secret keys; and
communicate with the access control device to allow the access control device to verify the threshold cryptography application using the public key.

D11. The coordinating user device according to item D10, wherein the first user device is the coordinating user device.

D12. The coordinating user device according to item D10 or D11, further comprising instructions that, when executed by the processor, cause the coordinating user device, prior to the applying the first partial secret key, to:
receive a data item from the access control device, wherein the data item is used in the coordinating with the first user device and in the coordinating with at least a second user device to apply the second partial secret key to the data item, wherein the applying comprises cryptographically signing the data item using the respective partial secret keys.

D13. The coordinating user device according to any one of items D10 to D12, wherein the instructions to coordinate with the at least the second user device comprise instructions that, when executed by the processor, cause the coordinating user device to request a third user device to apply a third partial secret key to the data item, wherein the third partial secret key forms part of the set of partial secret keys.

D14. The coordinating user device according to any one of items D10 to D13, wherein at least one of the user devices is given increased weight in the cryptography scheme by being assigned a set of partial secret keys.

D15. The coordinating user device according to any one of items D10 to D14, wherein at least one partial secret key of the set of partial secret keys forms a subordinate threshold cryptography scheme with an associated subordinate public key wherein a threshold number of a set of subordinate partial secret keys are required to be applied in the subordinate threshold cryptography scheme for verification against the subordinate public key.

D16. The coordinating user device according to any one of items D10 to D15, wherein the threshold number is less than the set of partial secret keys.

D17. The coordinating user device according to any one of items D10 to D16, wherein the threshold number is equal to or greater than two.

D18. The coordinating user device according to any one of items D10 to D17, wherein the threshold cryptography scheme is based on an Elliptic Curve Digital Signature Algorithm, ECDSA.

D19. A computer program for authenticating with an access control device, the computer program comprising computer program code which, when executed on a coordinating user device causes the coordinating user device to:
coordinate with a first user device to apply a first partial secret key, associated with the first user device, to a data item, wherein the first partial secret key is part of a set of partial secret keys of a threshold cryptography scheme associated with a public key, wherein a threshold number of the set of partial secret keys are required to be applied in the threshold cryptography scheme for verification against the public key;
coordinate with request at least a second user device to apply the second partial secret key to the data item, wherein the second partial secret key forms part of the set of partial secret keys; and
communicate with the access control device to allow the access control device to verify the threshold cryptography application using the public key.

D20. A computer program product comprising a computer program according to item D19 and a computer readable means comprising non-transitory memory in which the computer program is stored.

Sixth Set of Embodiments

There are many types of hardware where its integrity needs to be verified. For instance, in corporate IT infrastructures, the employees may be forbidden to replace hardware in a computer, since any new hardware can introduce a new security risk in the corporate IT infrastructure. Such a risk could be exploited by attackers to gain control of the computer, which can be a portal to the entire corporate IT network.

In order to monitor hardware, the IT department needs to keep track of all hardware of all computers or other electronic devices. For large companies, this task can easily grow out of proportion, resulting in a great amount of time and resources that are applied only for this task. It would thus be of great benefit if it could be detected when hardware components are changed in a device, without knowing the structure of the device beforehand. There are also other situations where there is great benefit to verifying hardware integrity.

One object is to enable a flexible, yet secure, way to verify that a sufficient number of hardware components of an electronic device have not been replaced or removed.

Embodiments in the sixth set exploit threshold cryptography for monitoring hardware integrity of an electronic device (e.g. a computer or other electronic device comprising multiple components with their own processing capability). As explained in more detail with reference to FIG. 2 above, threshold cryptography enables authorisation based on any t number of n partial secret keys being applied. To set this up (when all hardware components that need to be checked are installed in the electronic device), partial keys are provided to n hardware components. For verifying integrity of the electronic device, any t out of the n hardware components need to apply their partial signature. For instance, 3 out of 4 hardware components can apply their signature to an integrity indicator. The validity of the integrity indicator can be verified according to traditional public key verification. In other words, the threshold cryptography on the secret side (the monitored electronic device) does not result in any different processing on the verification side, making the implementation of the verification simple.

FIG. 16 is a schematic diagram illustrating an environment in which embodiments presented herein can be applied. An electronic device 502 is an electronic device comprising components with separate processing capability. For instance, the electronic device can be a computer device of any suitable form, such as a desktop computer, laptop computer, tablet computer, smartphone or even a wearable device. The electronic device 502 could alternatively be a special purpose device, e.g. vending machine, ATM (automatic teller machine), IoT (Internet of Things) device, etc. The electronic device 502 is connected to a communication network 507, such as the Internet.

The electronic device 502 comprises a plurality of hardware components 504a-d. Each hardware component comprises some form of processing capability to be able to apply partial secret keys 10a-d, as explained in more detail below. In the example of FIG. 16, the hardware components 504a-d are illustrated as a first hardware component 504a being a persistent storage device (e.g. a solid-state drive or hard drive), a second hardware component 504b being a central processing unit (CPU), a third hardware component 504c being a graphics processing unit (GPU), and a fourth hardware component 504d being an input/output device 504d. There can of course be many other hardware components, e.g. motherboard, fingerprint reader, smartcard reader, etc.

A hardware integrity device 501 is used to set up hardware integrity control of the electronic device 502. In order to set up the hardware integrity control, the hardware integrity device 501 triggers the generation of partial secret keys 10a-d by the respective hardware components 504a-d of the electronic device 502 that can make use of the partial secret keys 10a-d. Each one of the hardware components 504a-d comprise some sort of processing capability to be able to apply its respective partial secret key 10a-d. The hardware integrity device 501 generates a corresponding public key 12 of the threshold cryptography scheme and provides the public key 12 to the hardware verification device 503.

As explained in more detail below, when needed, the hardware components 504a-d apply their respective partial secret keys 10a-d to apply a cryptographic signature to an integrity indicator (being a set of data for indicating hardware integrity). The signature of the integrity indicator can then be verified by the hardware verification device 503 by checking against the public key 12, to thereby implicitly determine whether the threshold condition of the threshold cryptography has been met. In other words, if at least the threshold number t of partial secret keys has been applied (as defined when the threshold cryptography scheme was set up), the public key verification is positive.

One use case for this hardware check of an electronic device in the form of a computer is in a corporate computer infrastructure, where it thus can be verified that individual computer users do not replace or remove hardware, which could lead to security risks. The hardware integrity verification can e.g. occur as part of connecting to a corporate network e.g. over a LAN (Local Area Network) or a VPN (Virtual Private Network) connection. Another use case is an electronic lock that verifies hardware integrity of itself, i.e. that nobody has removed or replaced any lock hardware, in conjunction with performing access control. Another use case is that the operating system of a computer verifies that all (or threshold number) of hardware entities are present as part of the boot process. This can be particularly useful for high security computers, e.g. for use in the military or intelligence agencies. Another use case is for video on demand (VOD) or other streaming services, where the streaming provider can verify that the receiving computer has not had hardware modifications, e.g. for being able to download protected content.

Figure 17:
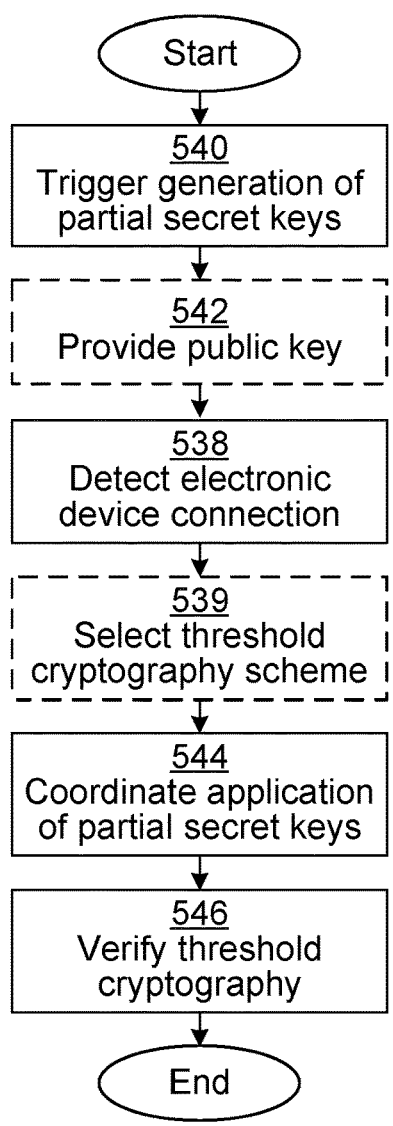
FIG. 17 is a flow chart illustrating embodiments of methods for providing hardware integrity control of an electronic device.

FIG. 17 is a flow chart illustrating embodiments of methods for providing hardware integrity control of an electronic device 502. The method is performed by a hardware integrity device 501 comprising a hardware verification device 503. It is to be noted that the same hardware can be used for the hardware integrity device 501 and the hardware verification device 503, whereby it is the software instructions that provide the different functions that are described for the hardware integrity device 501 and the hardware verification device 503 described herein.

In a trigger generation of partial secret keys step 540, the hardware integrity device 501 triggers each one of a plurality of components (504a-d) of the electronic device to generate of respective partial secret keys 10a-d forming part of a threshold cryptography scheme 11 associated with a public key 12. A threshold number of the plurality of partial secret keys 10a-d are required to be applied in the threshold cryptography scheme 11 for verification against the public key 12.

As explained above, the threshold cryptography scheme 11 can e.g. be based on an Elliptic Curve Digital Signature Algorithm (ECDSA).

In an optional provide public key step 542, the hardware integrity device 501 provides the public key 12 to a hardware verification device 503. This enables the hardware verification device 503 to verify when the threshold number of partial secret keys have been applied, using the public key 12. Since the hardware verification device 3 and the hardware integrity device are provided using the same hardware, this step can be a case of internal signalling between software modules.

Optionally, this step comprises triggering to generate respective partial secret keys for a plurality of threshold cryptography schemes 11 with different security levels, e.g. where a higher threshold implies higher security since more components would then need to apply their partial secret keys for the threshold cryptography scheme to be satisfied.

In a detect electronic device connection step 538, the hardware integrity device detects that the electronic device 502 is in process of establishing access to a computer network. This can e.g. be detected by the electronic device 502 connecting to the computer network in the form of a local area network (LAN) or virtual private network (VPN), e.g. as part of a corporate network. Such computer networks often have processing that occurs on the network side as part of the electronic device 502 establishing a connection to the computer network. The processing of this method can be performed in that context.

In an optional select threshold cryptography scheme step 539, hardware integrity device 501 selects one of the plurality of different threshold cryptography schemes based on the identity of the computer network. For instance, the selecting can comprise selecting a threshold cryptography scheme 11 with a higher threshold the computer network when the computer network is of higher security.

In an optional coordinate application of partial secret keys step 544, the hardware integrity device 501 coordinates, with the plurality of hardware components 504*a-d*, the application of partial secret keys 10*a-d* for verification by the hardware verification device 503. This coordination con be based on several sub-steps. First, the hardware integrity device 501 receives an integrity indicator, being a set of data for indicating hardware integrity, from the hardware verification device 503. Second, the hardware integrity device 501 communicates with the electronic device 502 for at least the threshold number of hardware components 504*a-d* of the electronic device 502 applying respective signatures to the integrity indicator using their respective partial secret keys 10*a-d*. The resulting, cryptographically signed, integrity indicator is then provided to the hardware verification device 503 either by the electronic device directly, or via the hardware integrity device 501.

The integrity indicator can be generated by the hardware verification device 503, such that the integrity indicator comprises a newly generated random, or difficult to guess, number, to ensure that the signature is recently applied.

The threshold number can be less than the number of the plurality of partial secret keys 10*a-d*, whereby not all of the hardware components 504*a-d* need to apply their respective partial secret keys 10*a-d*. The threshold number is equal to or greater than two. This ensures that no single hardware component can be used to apply a valid complete signature to an integrity indicator. In one embodiment, the threshold number is equal to the number of the plurality of partial secret keys 10*a-d*, whereby all of the hardware components 504*a-d* need to apply their respective partial secret keys 10*a-d* for valid signing (or decryption), which can be verified (or encrypted) using the public key.

When the threshold number of the plurality of partial secret keys 10*a-d* have been applied, the hardware verification device 503 can verify that the required number of hardware components are present in the electronic device, in accordance with the threshold cryptography scheme. As mentioned above, this verification is based on the public key 12 corresponding to the threshold cryptography scheme.

It is to be noted that a single electronic device can be part of different threshold cryptography schemes that area applied depending on the situation. For instance, a computer can be configured in a first threshold cryptography scheme having a threshold of 3 of 4 components applying their respective partial secret keys. In parallel, the same computer can be configured in a second threshold cryptography scheme having a threshold of 4 of 4 components applying their respective partial secret keys. The first cryptography scheme could e.g. be applied for a general access to a corporate network while the second cryptography scheme could be applied for access to a particularly sensitive network.

In a verify threshold cryptography step 546, the hardware integrity device 501 verifies that the threshold cryptography scheme 11 is satisfied. When the threshold cryptography scheme is satisfied, the hardware integrity device 501 enables the electronic device 502 to connect to the computer network. When the threshold cryptography scheme is not satisfied, the hardware integrity device 501 blocks the electronic device 502 from connect to the computer network.

When the select threshold cryptography scheme step 539 is performed, the coordinate application of partial secret keys step 544 of and the verify threshold cryptography step 546 are based on the threshold cryptography scheme selected in the select threshold cryptography scheme step 539.

Using embodiments presented herein, threshold cryptography is used to ensure that a sufficient number of hardware components of an electronic device have not been replaced or removed since the partial secret keys 10*a-d* were provided to the hardware components 504*a-d* by the hardware integrity device 501.

The hardware verification device 503 does not need to know how many hardware components 504*a-d* that are involved or required; the verification using the public key is a conventional verification of possession of the secret key, even if the secret key is based on threshold cryptography, i.e. at least a threshold number of partial secret keys have been applied.

Figure 18A:
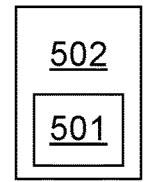
FIGS. 18A-C are schematic diagrams illustrating embodiments of where the hardware integrity device of FIG. 16 can be implemented.
Figure 18B:
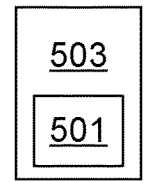
Figure 18C:
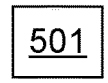

FIGS. 18A-C are schematic diagrams illustrating embodiments of where the hardware integrity device 501 can be implemented.

In FIG. 18A, the hardware integrity device 501 shown as implemented in the electronic device 502. The electronic device 502 is thus the host device for the hardware integrity device 501 in this implementation. Hence, the electronic device 502 then triggers the generation of the partial secret keys and the public key, and provides the public key to the hardware verification device 503.

In FIG. 18B, the hardware integrity device 501 shown as implemented in the hardware verification device 503. The hardware verification device 503 is thus the host device for the hardware integrity device 501 in this implementation. In this embodiment, it is the hardware verification device 503 that triggers the generation the partial secret keys and the public key, and provides the partial secret keys to the electronic device and its components 504*a-d*.

In FIG. 18C, the hardware integrity device 501 is shown as implemented as a stand-alone device. The hardware integrity device 501 thus does not have a host device in this implementation. In this embodiment, the hardware integrity device 501 triggers generation of the partial secret keys and the public key, provides the partial secret keys to the electronic device and its components 504*a-d* and provides the public key to the hardware verification device 503.

Here now follows a set of items for the sixth set of embodiments.

E1. A method for providing hardware integrity control of an electronic device, the method being performed by a hardware integrity device comprising a hardware verification device, the method comprising:

triggering each one of a plurality of components of the electronic device to generate of respective partial secret keys forming part of a threshold cryptography scheme associated with a public key, wherein a threshold number of the plurality of partial secret keys are required to be applied in the threshold cryptography scheme for verification against the public key;

detecting that the electronic device is in process of establishing access to a computer network;

coordinating, with the plurality of hardware components, the application of partial secret keys; and verifying that the threshold cryptography scheme is satisfied.

E2. The method according to item E1, wherein the triggering to generate respective partial secret keys comprises triggering to generate respective partial secret keys for a plurality of threshold cryptography schemes with different security levels; and wherein the method further comprises:

selecting one of the plurality of different threshold cryptography schemes based on the identity of the computer network;

and wherein the coordinating and verifying is based on the selected threshold cryptography scheme.

E3. The method according to item E2, wherein the selecting comprises selecting a threshold cryptography scheme with a higher threshold the computer network when the computer network is of higher security.

E4. The method according to item E3, wherein the coordinating comprises receiving an integrity indicator, being a set of data for indicating hardware integrity, from the hardware verification device and communicating with the electronic device for at least the threshold number of hardware components of the electronic device applying respective signatures to the integrity indicator using their respective partial secret keys.

E5. The method according to any one of items E1 to E4, wherein the threshold number is less than number of the plurality of partial secret keys.

E6. The method according to any one of items E1 to E5, wherein the threshold number is equal to or greater than two.

E7. The method according to any one of items E1 to E6, wherein the threshold cryptography scheme is based on an Elliptic Curve Digital Signature Algorithm, ECDSA.

E8. A hardware integrity device for providing hardware integrity control of an electronic device, the hardware integrity device comprising:

a hardware verification device:

a processor; and a memory storing instructions that, when executed by the processor, cause the hardware integrity device to:

trigger each one of a plurality of components of the electronic device to generate respective partial secret keys forming part of a threshold cryptography scheme associated with a public key, wherein a threshold number of the plurality of partial secret keys are required to be applied in the threshold cryptography scheme for verification against the public key;

detect that the electronic device is in process of establishing access to a computer network;

coordinate, with the plurality of hardware components, the application of partial secret keys for verification by the hardware verification device; and verify that the threshold cryptography scheme is satisfied.

E9. The hardware integrity device according to item E8, wherein the instructions to trigger to generate respective partial secret keys comprise instructions that, when executed by the processor, cause the hardware integrity device to trigger to generate respective partial secret keys for a plurality of threshold cryptography schemes with different security levels; and wherein the hardware integrity device further comprises instructions that, when executed by the processor, cause the hardware integrity device to:

select one of the plurality of different threshold cryptography schemes based on the identity of the computer network;

and wherein the instructions to coordinate and verify comprise instructions that, when executed by the processor, cause the hardware integrity device to coordinate and verify based on the selected threshold cryptography scheme.

E10. The hardware integrity device according to item E9, wherein the instructions to select comprise instructions that, when executed by the processor, cause the hardware integrity device to select a threshold cryptography scheme with a higher threshold the computer network when the computer network is of higher security.

E11. The hardware integrity device according to item E10, wherein the instructions to coordinate comprise instructions that, when executed by the processor, cause the hardware integrity device to receive an integrity indicator, being a set of data for indicating hardware integrity, from the hardware verification device; communicating with the electronic device for at least the threshold number of hardware components of the electronic device applying respective signatures to the integrity indicator using their respective partial secret keys.

E12. The hardware integrity device according to any one of items E8 to E11, wherein the threshold number is less than the number of the plurality of partial secret keys.

E13. The hardware integrity device according to any one of items E8 to E12, wherein the threshold number is equal to or greater than two.

E14. The hardware integrity device according to any one of items E8 to E13, wherein the threshold cryptography scheme is based on an Elliptic Curve Digital Signature Algorithm, ECDSA.

E15. A computer program for providing hardware integrity control of an electronic device, the computer program comprising computer program code which, when executed on a hardware integrity device comprising a hardware verification device 3, causes the hardware integrity device to:

trigger each one of a plurality of components of the electronic device to generate respective partial secret keys forming part of a threshold cryptography scheme associated with a public key, wherein a threshold number of the plurality of partial secret keys are required to be applied in the threshold cryptography scheme for verification against the public key;

detect that the electronic device is in process of establishing access to a computer network;

coordinate, with the plurality of hardware components, the application of partial secret keys for verification by the hardware verification device; and verify that the threshold cryptography scheme is satisfied.

E16. A computer program product comprising a computer program according to item E14 and a computer readable means comprising non-transitory memory in which the computer program is stored.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art.

The various aspects and embodiments disclosed herein are for purposes of illustration and are not intended to be limiting, with the true scope and spirit being indicated by the following claims.

The invention claimed is:

1. A method for performing an action by an electronic device, based on a first partial secret key and a corresponding second partial secret key, wherein the first partial secret key and the second partial secret key form part of a threshold cryptography scheme associated with a public key, the method being performed by the electronic device, the method comprising:
   transmitting, upon the electronic device initializing, a request for the first partial secret key to a key server;
   receiving the first partial secret key from the key server;
   storing the first partial secret key only in volatile memory;
   retrieving the second partial secret key from non-volatile memory; and
   performing an action based on applying both the first partial secret key and the second partial secret key, wherein the performing an action comprises:
      interacting with an authentication server to authenticate the electronic device based on performing a cryptographic operation, such that the electronic device applies both the first partial secret key and the second partial secret key, wherein a threshold of at least two partial secret keys of the threshold cryptography scheme are required for applying the threshold cryptography scheme for performing the cryptographic operation, wherein a positive authentication is necessary for normal operation of the electronic device and a negative authentication results in the electronic device setting itself in a non-operational state.

2. The method according to claim 1, wherein the performing an action comprises at least one of: decrypting data stored in the non-volatile memory, communicating with an external entity, or communicating with an internal entity in which the electronic device is provided.

3. The method according to claim 1, further comprising:
   receiving an updated second partial secret key, corresponding to an updated first partial secret key, that collectively form part of the threshold cryptography scheme that still corresponds to the public key; and
   replacing the second partial secret key previously stored in non-volatile memory with the updated second partial secret key.

4. The method according to claim 1, wherein the interacting comprises applying a cryptographic signature to a data item provided by the authentication server.

5. The method according to claim 1, wherein the threshold of partial secret keys required for applying the threshold cryptography scheme is two and the threshold cryptography scheme contains only two partial secret keys.

6. The method according to claim 1, wherein the threshold cryptography scheme is based on an Elliptic Curve Digital Signature Algorithm, ECDSA.

7. An electronic device for performing an action based on a first partial secret key and a corresponding second partial secret key, wherein the first partial secret key and the second partial secret key form part of a threshold cryptography scheme associated with a public key, the electronic device comprising:
   a processor; and
   a memory storing instructions that, when executed by the processor, cause the electronic device to:
      transmit, upon the electronic device initializing, a request for the first partial secret key to a key server;
      receive the first partial secret key from the key server;
      store the first partial secret key only in volatile memory;
      retrieve the second partial secret key from non-volatile memory; and
      perform an action based on applying both the first partial secret key and the second partial secret key;
      wherein the instructions to perform an action comprise instructions that, when executed by the processor, cause the electronic device to:
         interact with an authentication server to authenticate the electronic device based on performing a cryptographic operation, such that the electronic device applies both the first partial secret key and the second partial secret key, wherein a threshold of at least two partial secret keys of the threshold cryptography scheme are required for applying the threshold cryptography scheme for performing the cryptographic operation, wherein a positive authentication is necessary for normal operation of the electronic device and a negative authentication results in the electronic device setting itself in a non-operational state.

8. The electronic device according to claim 7, wherein the instructions to perform an action comprise instructions that, when executed by the processor, cause the electronic device to perform at least one of: decrypting data stored in the non-volatile memory, communicating with an external entity, or communicating with an internal entity in which the electronic device is provided.

9. The electronic device according to claim 7, further comprising instructions that, when executed by the processor, cause the electronic device to:
   receive an updated second partial secret key, corresponding to an updated first partial secret key, that collectively form part of the threshold cryptography scheme that still corresponds to the public key; and
   replace the second partial secret key previously stored in non-volatile memory with the updated second partial secret key.

10. The electronic device according to claim 7, wherein the instructions to interact comprise instructions that, when executed by the processor, cause the electronic device to apply a cryptographic signature to a data item provided by the authentication server.

11. The electronic device according to claim 7, wherein the threshold of partial secret keys required for applying the threshold cryptography scheme is two and the threshold cryptography scheme contains only two partial secret keys.

12. The electronic device according to claim 7, wherein the threshold cryptography scheme is based on an Elliptic Curve Digital Signature Algorithm, ECDSA.

13. A non-transitory computer readable medium storing a computer program for performing an action by an electronic device based on a first partial secret key and a corresponding second partial secret key, wherein the first partial secret key and the second partial secret key form part of a threshold cryptography scheme associated with a public key, the computer program comprising computer program code which, when executed on an electronic device, causes the electronic device to:
   transmit, upon the electronic device initializing, a request for the first partial secret key to a key server;
   receive the first partial secret key from the key server;
   store the first partial secret key only in volatile memory;
   retrieve the second partial secret key from non-volatile memory; and perform an action based on applying both the first partial secret key and the second partial secret key;

wherein the computer program code for performing the action comprises computer program code which, when executed on an electronic device, causes the electronic device to:

interact with an authentication server to authenticate the electronic device based on performing a cryptographic operation, such that the electronic device applies both the first partial secret key and the second partial secret key, wherein a threshold of at least two partial secret keys of the threshold cryptography scheme are required for applying the threshold cryptography scheme for performing the cryptographic operation, wherein a positive authentication is necessary for normal operation of the electronic device and a negative authentication results in the electronic device setting itself in a non-operational state.

* * * * *